(12) United States Patent
Rasmussen

(10) Patent No.: US 10,300,654 B2
(45) Date of Patent: May 28, 2019

(54) METHODS OF MANUFACTURING SEQUENTIALLY STRETCHED POLYMER FILMS, APPARATUS USED FOR SUCH METHODS, AND PRODUCTS OBTAINED THEREBY

(71) Applicant: Ole-Bendt Rasmussen, Walchwil (CH)

(72) Inventor: Ole-Bendt Rasmussen, Walchwil (CH)

( * ) Notice: Subject to any disclaimer, the term of this patent is extended or adjusted under 35 U.S.C. 154(b) by 81 days.

(21) Appl. No.: 15/121,898

(22) PCT Filed: Feb. 27, 2015

(86) PCT No.: PCT/EP2015/054146
§ 371 (c)(1),
(2) Date: Aug. 26, 2016

(87) PCT Pub. No.: WO2015/128467
PCT Pub. Date: Sep. 3, 2015

(65) Prior Publication Data
US 2017/0021555 A1 Jan. 26, 2017

Related U.S. Application Data

(60) Provisional application No. 61/945,755, filed on Feb. 27, 2014.

(51) Int. Cl.
*B29C 55/00* (2006.01)
*B29C 47/00* (2006.01)
*B32B 7/00* (2006.01)
*B32B 27/00* (2006.01)
*B29C 55/18* (2006.01)
(Continued)

(52) U.S. Cl.
CPC .......... *B29C 55/18* (2013.01); *B29C 47/0021* (2013.01); *B29C 47/0057* (2013.01); *B29C 47/065* (2013.01); *B29C 55/023* (2013.01); *B32B 7/12* (2013.01); *B32B 27/32* (2013.01); *B29K 2023/065* (2013.01); *B29K 2023/0625* (2013.01); *B29K 2023/12* (2013.01); *B29L 2007/008* (2013.01); *B29L 2009/00* (2013.01); *B32B 2323/043* (2013.01); *B32B 2323/10* (2013.01)

(58) Field of Classification Search
CPC ......... B29C 55/00; B29C 55/10; B29C 55/18; B29C 55/02; B29C 55/02; B29C 55/023; B29C 47/00; B29C 47/002; B29C 47/002; B29C 47/0021; B29C 47/05; B29C 47/005; B29C 47/0057; B29C 47/06; B29C 47/06; B29C 47/065; B32B 7/00; B32B 7/10; B32B 7/12; B32B 27/00; B32B 27/30; B32B 27/32
See application file for complete search history.

(56) References Cited

U.S. PATENT DOCUMENTS 8,309,206 B2 * 11/2012 Rasmussen
8,557,364 B2 * 10/2013 Rasmussen
8,795,810 B2 * 8/2014 Rasmussen

FOREIGN PATENT DOCUMENTS

WO WO 0056522 A1 * 9/2000 ............. B29C 55/14

* cited by examiner

*Primary Examiner* — Jacob T Minskey
*Assistant Examiner* — Matthew Hoover
(74) *Attorney, Agent, or Firm* — Robert W. Strozier

(57) ABSTRACT

Methods include at least one sequential stretching step between circular or spiralized grooved rollers and the sequential stretching is performed according to at least one of six aspects of the invention.

24 Claims, 9 Drawing Sheets

(51) Int. Cl.
  *B29C 55/02*   (2006.01)
  *B29C 47/06*   (2006.01)
  *B32B 7/12*    (2006.01)
  *B32B 27/32*   (2006.01)
  *B29K 23/00*       (2006.01)
  *B29L 7/00*        (2006.01)
  *B29L 9/00*        (2006.01)

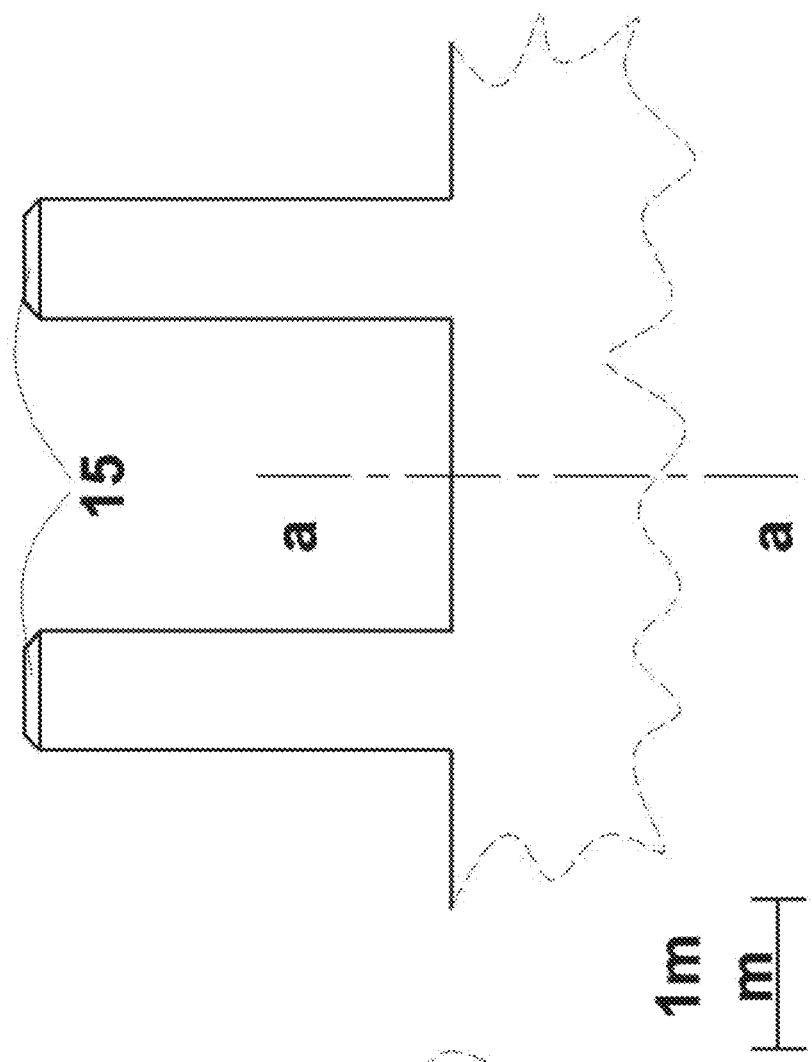
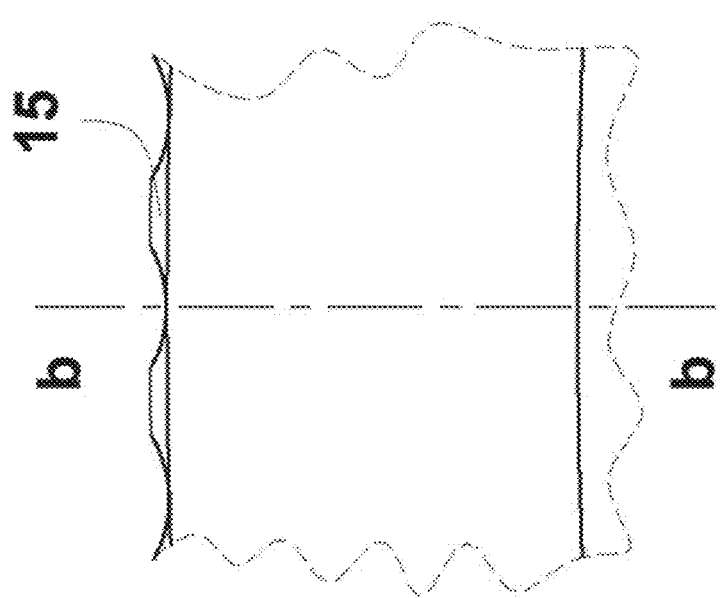

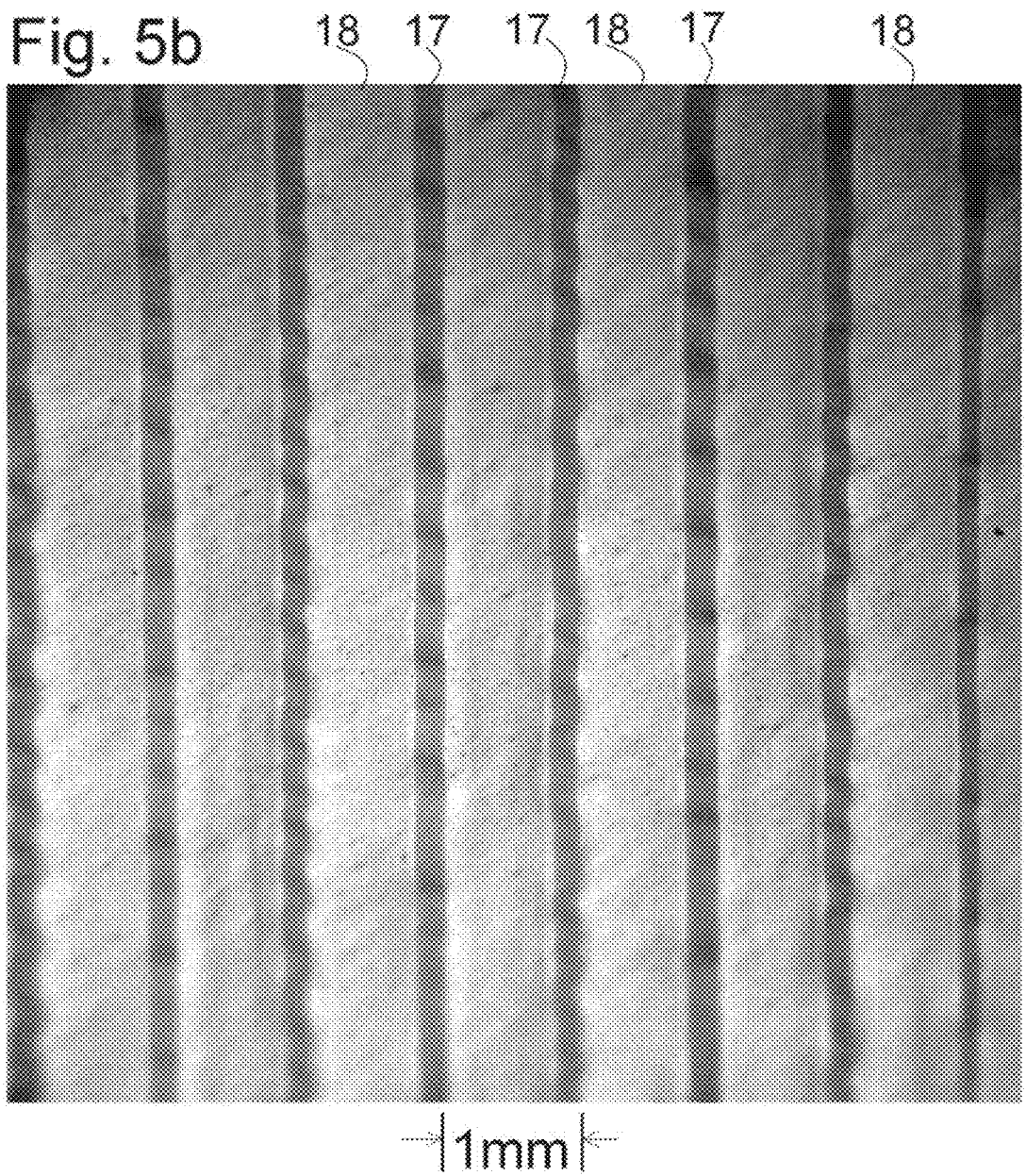

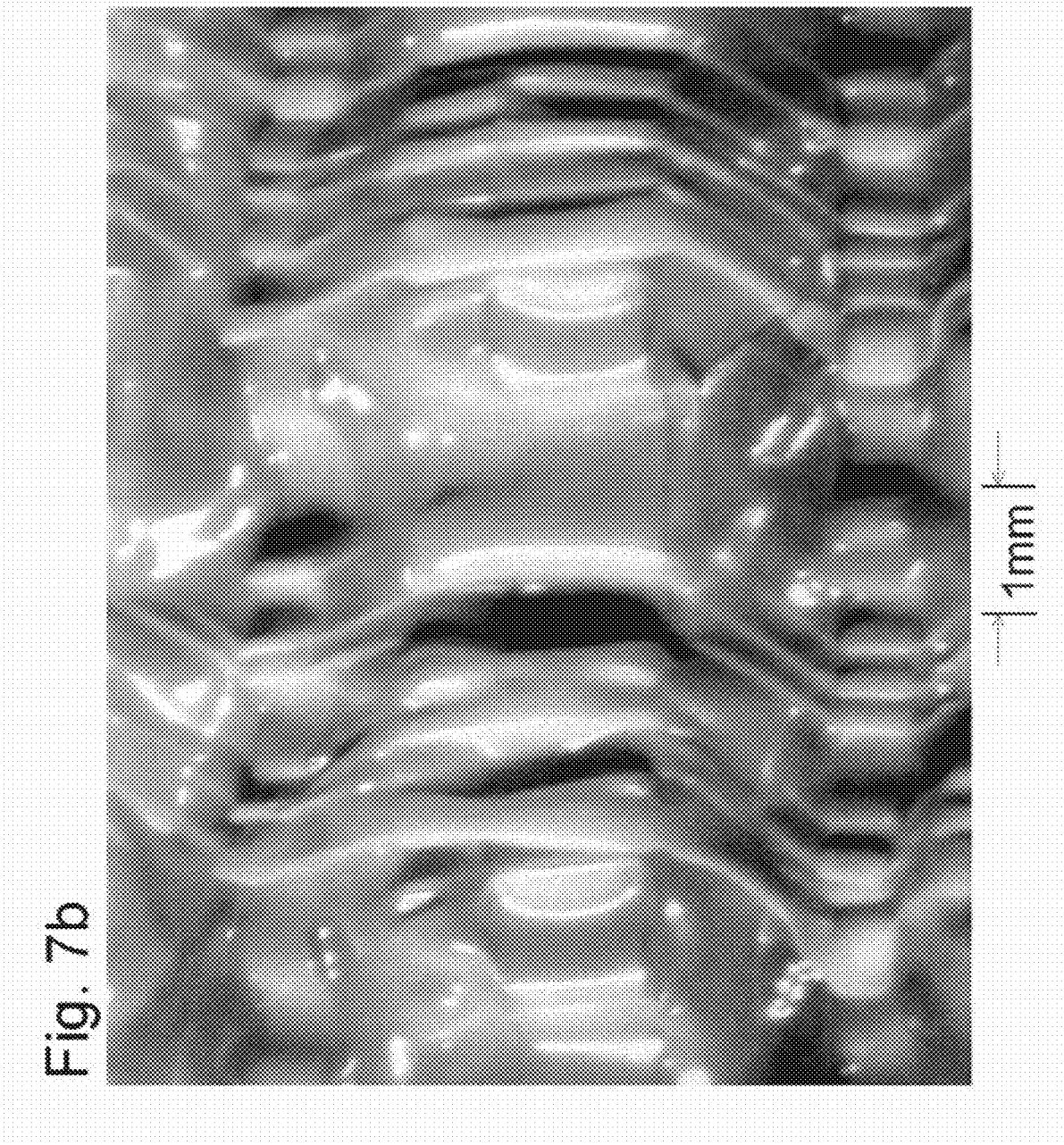

METHODS OF MANUFACTURING SEQUENTIALLY STRETCHED POLYMER FILMS, APPARATUS USED FOR SUCH METHODS, AND PRODUCTS OBTAINED THEREBY

RELATED APPLICATIONS

This application is a 3 U.S.C. § 371 national phase filing of International Application Number PCT/EP2015/054146 filed 27 Feb. 2015 (Feb. 27, 2015), which claims priority to and the benefit of U.S. Provisional Patent Application Ser. No. 61/945,755 filed 27 Feb. 2014 (Feb. 27, 2014).

BACKGROUND OF THE INVENTION

1. Field of the Invention

Embodiments of this invention relate to methods and products produced by the methods, where the methods include at least one sequential stretching step between circular or spiralized grooved rollers, or modified circular or spiralized grooved rollers.

More particularly, embodiments of this invention relate to methods and products produced by the methods, where the methods include at least one sequential stretching step between such circular or spiralized grooved rollers and the sequential stretching is preformed according to one of at least six aspects described more fully herein.

2. Description of the Related Art

Sequentially stretched products are well known. They are obtained under use of one or more steps of stretching between mutually intermeshing grooved rollers. The grooves of such rollers can be circular, helical or parallel with the axes of the rollers. Prior and/or subsequent to this grooved roller stretching, the film may be evenly stretched in its longitudinal and/or transverse direction.

The sequentially stretched products consist of differently oriented regions, interspersed with one another. This has importance for tear propagation and puncture properties. The following examples of published patent applications deal with such technology and are relevant in connection with the present invention: U.S. patent application Ser. No. 14/023,120 Rasmussen & Rasmussen; U.S. Publication No. 2012/0033900A1 Fraser et al.; U.S. Publication No. 2012/0039550A1 McPherson et al.; WO 213/116264A2 Borchardt et al.; U.S. Publication No. 2012/0269466A1 Dorsey et al.; and U.S. Publication No. 2013/0209711A1 Borchardt et al.

In the method according to the above mentioned U.S. patent application Ser. No. 14/023,120 one film or several films on top of each other are stretched between grooved rollers in a direction, which is different from, but at the highest 80° different from the predominant original direction of orientation in each film. The crests on the grooved rollers are sufficiently sharp to form a distinct division (as further defined in that application) between film material stretched between the crests, and bands of stretched film material, which have laid on and followed the crests. The sharp edges of the latter have prevented stretching of these bands. This prior art Patent Application specifies 3 different ways of obtaining the angle lower than 80° between the original direction of orientation, and the direction of stretching, namely: The film is extruded in tubular shape with a longitudinal orientation dominating. It may or may not be further stretched in this direction. It is helically slit to form a web with a generally mono-axial orientation under an angle to the new machine direction, and is finally segmentally stretched between grooved rollers with circular grooves (also called Ring Rollers). Two or more such helically slit tubes may here be ring-rolled together after being "sandwiched" with criss-crossing directions or orientations. (In some literature, there is distinguished between "crosslaminate", in which the plies always are bonded together, and "cross-sandwich" in which the plies may or may not be bonded together). The common ringrolling process will normally be enough to form a pattern of bonding/no bonding, which is claimed to be suitable for tear propagation resistance.

Instead of using helical cutting to obtain angular orientation in the web before ring-rolling, the exit of the extrusion die may rotate to form a spiralized melt orientation in the extruded film. This may be collapsed to form a "cross-sandwich" or crosslaminate.

As under the first described procedure, the single film with angular orientation or the crosssandwich, is finally stretched between ring-rollers with sharp edged crests.

As a third option, the mentioned patent application claims that the angle lower than 80° between the extension of the unstretched bands and the direction of stretching, can be obtained by use of mutually intermeshing grooved rollers with spiralized grooves. This third option has particular importance in connection with the present invention.

The present invention concerns improvements, seen in relation to these inventions, in the technologies relating to segmentally stretched polymer films.

SUMMARY OF THE INVENTION

First Process Embodiments

Embodiments of this invention provide processes of segmentally stretching a film or assembly of films comprising the steps of feeding the film or the assembly of films under longitudinal tension in a nip between mutually intermeshing, rotating first grooved rollers (1) and (2) having first helically shaped grooves making an angle between 10 degrees (10°) and 75 degrees (75°) with a roller axis and stretching the film or the assembly as it passes through the first grooved rollers (1) and (2). The process also include counteracting a screwing effect of the helically shaped grooved rollers, where the screwing effect tends to move the film or the assembly to a first side as the film or the assembly passes through the rollers and where the counteracting step comprises: (a) supplying fine indentations on crests of one or both of the grooved rollers (1) and (2) to establish a frictional resistance to the screwing effect, or (b) immediately in front of the nip, passing the tentered film or the assembly over a roller having fine helical grooves adapted to give the film or the assembly a tendency to move in a direction opposite to the first side, or (c) immediately in front of the nip, passing the tentered film or the assembly over a rounded surface of a fixed bar, where the rounded surface includes fine angularly directed grooves adapted to give the film or the assembly a tendency to move in a direction opposite to the first side, or (d) supplying fine indentations on crests of one or both of the grooved rollers (1) and (2) to establish a frictional resistance to the screwing effect and immediately in front of the nip, passing the tentered film or the assembly over a tentering roller having fine helical grooves adapted to give the film or the assembly a tendency to move in a direction opposite to the first side, or (e) supplying fine indentations on crests of one or both of the grooved rollers (1) and (2) to establish a frictional resistance to the screwing effect and immediately in front of the nip, passing the tentered film or the assembly over a rounded surface of a fixed bar, where the rounded surface includes fine angularly directed grooves adapted to give the film or the assembly a tendency to move in a direction opposite to the first side.

In certain embodiments, a depth of the indentation is less than or equal to 50% of a dimension of the mutual intermeshing of the crests of the rollers (1) and (2) and preferably the depth of the indentation is less than or equal to 25% of a dimension of the mutual intermeshing of the crests of the rollers (1) and (2). In other embodiments, the indentations comprise fine second grooves in the crests disposed substantially perpendicular to the first grooves in the roller.

In other embodiments, the processes further comprise heating the film or the assembly to a first stretching temperature before meeting the grooved stretching rollers (1) and (2), and maintaining the grooved stretching rollers (1) and (2) at a maintenance temperature substantially lower than the first stretching temperature so that the film or the assembly becomes cooled in regions, where the film or the assembly contacts the grooved stretching rollers (1) and (2).

In other embodiments, the processes further comprise prior to the feeding step, evenly or segmentally stretching the film or at least one of the films of the assembly substantially in a longitudinal direction at a second stretching temperature below a melting temperature of the film, preferably the second stretching temperature is substantially at ambient temperature. In other embodiments, each crest on the first grooved rollers has two distinct, substantially helical edges.

Second Process Embodiments

Embodiments of this invention provide processes of sequentially stretching a film or assembly of films comprising the steps of feeding the film or the assembly of films in a nip between mutually intermeshing, rotating grooved rollers (1) and (2), where the grooves are helically shaped under an angle between 10 degrees (10°) and 75 degrees (75°) to a roller axis, and where a first axial position of the crests on one of the grooved rollers relative to a second axial position of the crests on the other grooved roller is variable and adjustable, driving the two rollers independently of each other via adjustable motors so that a speed of each roller may be adjusted independently, or allowing one of the roller (1) and (2) to slide axially.

In certain embodiments, there is exerted a controllable axial force on the slidable roller by a spring controlled means, a pneumatic means, or a hydraulic means. In certain embodiments, each of the crests on the grooved rollers has two distinct, substantially helical edges.

Third Process Embodiments

Embodiments of this invention provide processes of sequentially stretching a film or assembly of films comprising the steps of feeding a film or a assembly of films in a machine direction under longitudinal tension into a nip between mutually intermeshing, rotating first grooved rollers (1) and (2) with first grooves, where the first grooves are helically shaped under an angle between 10 degrees (10°) and 75 degrees (75°) to a roller axis, sequentially stretching the film or the assembly as it passes through the first grooved rollers (1) and (2), and pulling off the film or the assembly from the grooved rollers (1) and (2), while being stretched in the machine direction and while a transverse contraction substantially is avoided, the machine direction stretching being carried out between the grooved rollers and at least one roller closely spaced to the first grooved rollers.

In certain embodiments, one or both of the first grooved rollers within one or more cylindrical sections are without grooves to avoid any angular stretching in one or more longitudinally extending regions of the film or assembly. In other embodiments, the avoidance of angular stretching comprises one or both sides of the film or assembly. In other embodiments, one or both of the grooved rollers (1) and (2) are composed of segments, and a narrow section where two segments contact each other are without grooves, and the segments which constitute one of the grooved rollers are made axially slidable on a core of this roller.

Fourth Process Embodiments

Embodiments of this invention provide processes of producing a film product, comprising the steps of coextruding an assembly of thermoplastic polymer films, where one side of the assembly comprises a film or a group of mutually strongly bonded films (A) and the other side comprises a film or a group of mutually strongly bonded films (B), and in one or a plurality of stretching steps the assembly of films is stretched at a stretching temperature below a melting temperature range of the films, where at least one of the stretching steps is carried out sequentially via circularly, helically or axially grooved rollers to produce at least one series of segments (G) and another series of segments (F), where the segments (F) are stretched to a lesser degree than the segments (G) or the segments (F) are left with an orientation substantially the same as an orientation of the assembly before the sequential stretching, where the composition of the assembly and the process conditions are selected so that (A) and (B) in the final film product are weakly bonded together such that they can peeled apart, this weak bonding being made by application of a bonding layer or group of bonding layers (C) of a lower thickness than each of the films or group of films (A) and (B), where the composition of (C) is selected so that it bonds to both (A) and (B) but fails cohesively during peeling of the final product, and where the composition of the assembly and the process conditions are selected so that at least one of the following three conditions are satisfied in the final film product: (A) and (B) exhibit different coefficients of elasticity (E) in each direction within each segment, (A) and (B) exhibit different directions of main orientation within each (F) segment or each (G) segment or within each (F) segment and each (G) segment, or the sequential stretching totally or practically destroys the bonding within the (G) series of segments, while the bonding within the (F) series of segments remains sufficient to make the film product an integral product. In certain embodiments, the low cohesive strength in (C) is achieved by admixture of a microgain formed agent for internal disruption during stretching. In certain other embodiments, the low cohesive strength in (C) is achieved by admixture of an incompatible polymer. In some embodiments, the sequential stretching converts (C) to fibre network.

In some embodiments, the sequential stretching is preceded by a substantially continuous stretching below a melting range along a machine direction of the extrusion.

First Film Product Embodiments

Embodiments of this invention provides film products comprises a coextruded sequentially stretched assembly of thermoplastic polymer films, where one side of the assembly comprises a film or a group of mutually strongly bonded films (A) and the other side comprises a film or mutually strongly bonded films (B), where the sequential stretching has formed at least two differently stretched series of segments (F) and (G) interspersed with each other, the (G) segments being more orientated than and thinner than the (F) segments, where each (F) segment and each (G) segment in each of the films or film groups (A) and (B) have a main direction of molecular orientation and the main direction of orientation in each (F) segment forms or angle (u) having a value between 5° and 90° inclusive to a main direction of orientation in an adjacent (G) segment, where (A) and (B) are weakly bonded together such that they can be peeled apart, this bonding being through a bonding layer or group of bonding layers (C) of a lower thickness than each of the films or group of films (A) and (B), and wherein at least one of the following three conditions are satisfied (A) and (B) exhibit different coefficients of elasticity (E) in each direction within each segment, (A) and (B) exhibit different directions of main orientation within each (F) segment or within each (G) segment or each (F) segment and each (G) segment, or the bonding is totally or practically destroyed within the (G) series of segments, while the bonding within the (F) series of segments remains sufficient to make the film product an integral product.

In certain embodiments, the cohesive failure in (C) has transformes (C) to a fibrous network. In other embodiments, each of the segments in the series (F) and each segment in the series (G) extend linearly and are mutually parallel. In other embodiments, the angles (u) have a value are between 15°-75°. In yet other embodiments, (A) for more than 55% consists of HDPE and (B) for more than 55% consists of LLDPE or LDPE or both. In other embodiments, (A) for more than 55% consists of PP and (B) for more than 55% consists of a polyethylene type. In other embodiments, (A) is a group of films comprising a lower melting heat-seal layer on a surface of the film product. In other embodiments, (B) is a group of films comprising a lower melting heat-seal layer on a surface of the film product.

Fifth Process Embodiments

Embodiments of this invention provide processes of orienting by sequentially stretching segments of a film or film assembly in a nip between two circularly or helically mutually intermeshing grooved roller (101) and (102), or such grooved rollers which additionally has been modified by indentations on the crests, in which the film or the assembly is stuffed into the nip by being supplied with a fine traverse waving either prior to or while entering the nip, and by the sequential stretching, which takes place during the passage through the nip, the waving becomes fully or partly eliminated in the segments which become oriented by the stretching, whereas the waving is essentially maintained in segments which do not become oriented, and is stabilized by a contraction in the stretched segments.

In certain embodiments, the stuffing is carried out as a separate step. In other embodiments, the stuffing occurs between rubber belts which engage the film or the assembly, while they contract from a longitudinally strained state to a less strained state. In other embodiments, the stuffing is carried out while the film or the assembly enters the nip by choosing the grooved rollers (101) and (102) as circular grooved rollers and rotating one of the rollers (101) at a circumferential velocity essentially higher than a circumferential velocity of the other roller (102), and of the entrance to the nip frictionally engaging the film or the assembly with the faster roller (101) sufficiently to feed the film or the assembly into the nip at a velocity which is higher than the velocity of the slower roller (102), whereby crests of the latter roller are supplied with indentations sufficient to reduce the velocity of the film or the assembly, preferably to bring the film or the assembly to follow the velocity of the slower roller (102).

In other embodiments, the frictional engagement of the film or assembly with the faster roller (101) is established by supplying the crests of this roller with smooth indentations, preferably essentially of wave form the smoothness being sufficient to allow harmless sliding of the stuffed film or assembly over the indented crests, while the stuffed film or assembly is in a strongly tentered state due to the transverse stretching. In other embodiments the grooved rollers (101) and (102) has a diameter equal to or lower than 70 mm. In other embodiments, the claimed steps are preceded by the steps according to the First, Second, and Third Process Embodiments (as set forth above), or any combination thereof. In still other embodiments the stretched parts of the manufactured film is made breathable by addition of microvoid forming particles to the polymer material.

Second Film Product Embodiments

Embodiments of this invention provides film products comprising waved narrow linearly first sequences extending in the machine direction with a main direction of orientation in this direction, the waves establishing a stuffing in this direction and there between narrow lineary substantially flat second sequences with a main direction of orientation substantially perpendicular to the machine direction, the first sequences being thicker than the second sequences, and the depth of the waving being such that at least 20%, preferably 30% stretching, and more preferable 40% stretching in the machine direction is required to eliminate essentially all waving.

In certain embodiments a transverse test stretching in the machine direction sufficient to eliminate essentially all waving has elastic character, such that the film can revert to the state which it had before the test stretching. In other embodiments the first and second lienary sequences are narrower than 5 mm, preferably narrower than 2 mm, and still more preferably narrower than 1 mm. In still other embodiments the product is microporous.

Third Film Product Embodiments

Embodiments of this invention provides film products compnsmg waved narrow first sequences extending in the machine direction with a main direction of orientation in this direction, the waves establishing stuffing in this direction, and there between second sequences oriented under oblique angle between 45°-85° to the machine direction, this having zig-zagging character when comparing the orientation on either side of each first sequence. In certain embodiments, the product is microporous.

Sixth's Process Embodiments

Embodiments of this invention provide sequentially stretching a film or film assembly between mutually intermeshing first and second grooved rollers, which either have circular grooves or spiralized grooves with the spirals extending under an angle between 90° and 20° to the axes of the rollers, in which process the diameter of at least the first grooved rollers is 70 mm or less on which circular or spiralized grooved roller or rollers the crests may be supplied with indentations, and in which process any such roller with a diameter equal to or lower than 70 mm is supported against the pressure created by the sequential stretching by at least one short support roller on one side of the grooved roller and one short support roller on the other side of the grooved roller, arranged to nest the grooved roller. In certain embodiments, at least the circumferential surf aces of the short support rollers comprises a wear resistant polymer material. In other embodiments, the short support rollers are used to support a circular grooved stretching roller with indented crests, and the short support roller has a corresponding grooved surface with crests fitting into the grooves of the grooved stretching rollers, such that the support acts on the bottoms of the grooves of the stretching roller. In still other embodiments, the film product (P) manufactured therewith is after laminated with another film product (O), preferably to form a crosslaminate.

General Apparatuses

Another embodiments of this invention provides an apparatus suited for carrying out any of the processes set forth herein.

General Products

Another embodiments of this invention provides a product manufactured by use of any of the processes set forth herein.

BRIEF DESCRIPTION OF THE DRAWINGS

The invention can be better understood with reference to the following detailed description together with the appended illustrative drawings in which like elements are numbered the same:

FIGS. 3a&b depict a shape of one embodiment of indentation on a crest of the faster moving, circularly grooved roller (101) according to the fifth aspect of the invention; FIG. 3a depicts a section through a-a in FIG. 3b, i.e., perpendicular to the roller axis, and FIG. 3b depicts a section b-b in FIG. 3a, i.e., parallel with the roller axis.

FIG. 4a depicts a section through a-a in FIG. 4b, and FIG. 4b depicts a section through b-b in FIG. 4a.

in FIG. 7a the film was "stuffed" to 85% of its original length, and in FIGS. 7b to 50% of its original length.

DETAILED DESCRIPTION OF THE INVENTION

Figure 5A:
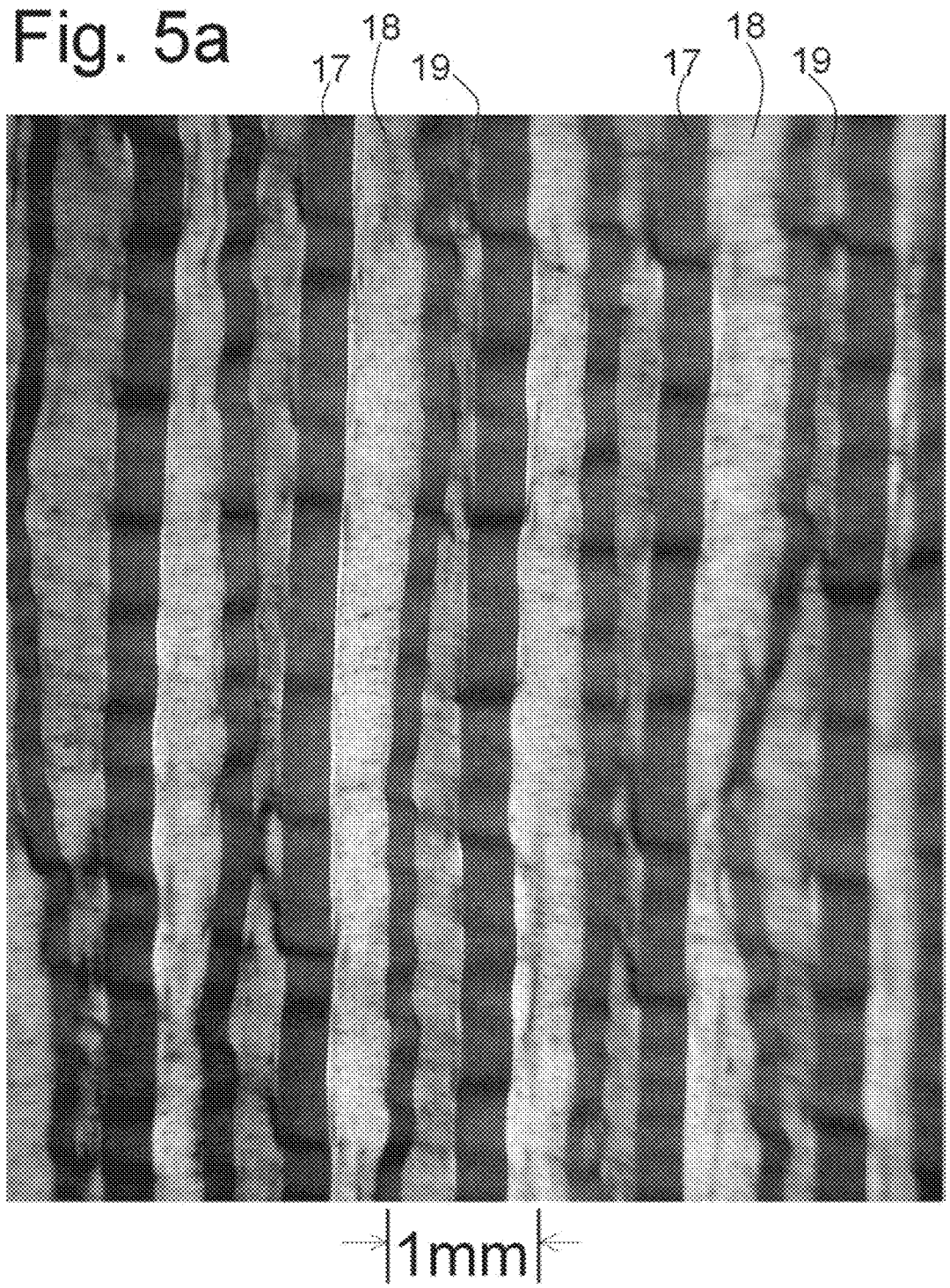
FIGS. 5a&b depict microphotos demonstrating the different results obtained by sequential stretching perpendicular to the original direction of orientation (FIG. 5a), and sequential stretching under an angle to that orientation (FIG. 5b).

The inventor of the present invention has found that stretching between circular grooved rollers of a longitudinally oriented film, always becomes less even than similar stretching in which the angle between the original direction of orientation and the direction of sequentially stretching is lower than 80°. See in this connection comparative microphotos FIG. 5a and FIG. 5b. In certain embodiments, the angles are between 20° and 70°. In most embodiments, the present invention involves at least one such step of stretching.

The present invention has six different aspects, all in relation to sequentially stretched film and the manufacture of such film. The six aspects can be carried out alone or in different combinations, as it will appear from the following. They may even be combined all six to one technology, see in this connection the flow sheet FIG. 1.

First Aspect of the Invention

The stretching between mutually intermeshing grooved rollers with helically formed grooves involve several problems, which do not occur in connection with grooved rollers which have circular grooves. One problem is that especially the grooved roller, which the film first meets, has a strong tendency to drag the film or film assembly to one side, thereby forming a deep biased pleating in the film as it approaches the grooved rollers. This problem cannot be solved by the use of ordinary edge control means, but according to the first aspect of the present invention it can be solved by two different means, which can be carried out separately or in combination. One way of solving the problem is to make fine indentations on the crests of one or both of these mutually intermeshing grooved rollers. Hereby there is created a substantial friction between the surface of the crest and the film or the assembly, and that acts against the undesirable gliding over the crests.

The other means consist in, immediately in front of the nip between the two grooved rollers, passing the film in longitudinally tentered state over a roller having fine helical grooves, or over a rounded surface with angularly directed grooves, in both cases so that the grooves give the film a tendency to drag sideways, opposite to the dragging excerted by the grooved stretching rollers. By adjustment of the tension in the film or in the film assembly, and/or of the passageway of the film or the film assembly, the two dragging effects can be brought to neutralize each other.

This first aspect of the invention is more precisely defined according to the First Process in the Summary of the invention, and special embodiments shall be explained later. Another problem concerning the stretching between mutually intermeshing grooved rollers with helically formed grooves, is the mutual fitting together of the crests on the two rollers. In the case of circular grooved rollers, only the axial adjustment matters, but in the case of rollers with spiralized grooves, the mutual angular adjustment is of a similar importance. This means that, at least for an industrial stretching machine, special precautions must be taken, the two grooved rollers cannot be driven in a mechanically fixed relation to each other as established by means of gear wheels, at the same time as each roller is fixed in its axial position.

Second Aspect of the Invention

The second aspect of the present invention provides two solutions to the problem. Before describing the two possible solutions, it should be mentioned, that it is possible to keep each spiralized roller fixed in its axial position, and use normal mechanical driving means for only one of the rollers.

Then the film or film assembly will act like a driving belt and drive the other grooved roller, however, the sequential stretching of the film material will then become very uneven.

One of the two suitable solutions to the described problem consists in driving the two rollers independently of each other from two motors and making the driving effect of each roller adjustable, so that the two motors work independent of each other. It is noted that the two rollers always run with the same circumferential velocity, since—as mentioned above—the film or film assembly between the rollers act as a kind of driving belt.

The other solution consists in allowing one of the two rollers free axial sliding. Then the forces acting on the slidable roller will act self-adjusting to produce a relatively even, but not perfectly even sequential stretching. It can become perfectly even by additional means described later in this specification.

The second aspect of the invention is more precisely described in detail in Second Process of the Summary of the Invention, and special embodiments shall be explained later.

Third Aspect of the Invention

The third aspect of the present invention concerns the procedure by which the film or film assembly is taken off from the spiralized grooved rollers after the angular stretching between these rollers. By itself the film or assembly tends to leave the rollers in a pleated state and under an angle to the machine direction of the grooved roller apparatus, therefore the natural way to treat it before spooling up or further processing is to let it follow a new machine direction and remove the pleats by means of banana rollers or similar tentering means. However, according to the third aspect of the invention, the film or film assembly which has been sequentially stretched is pulled from the grooved rollers while being stretched in the machine direction of these rollers, i.e., perpendicular to their axes. This m.d. stretching is carried out between the grooved rollers and at least one roller closely spaced to the spiralized grooved rollers, such that a transverse contraction of the film or film assembly is avoided, at least in essence.

The resulting stretch ratios can be studied by drawing circles on the film or film assembly before it enters the spiralized grooved rollers, and studying the resulting ellipses after the additional m.d. stretching. In this way it is found that, although the film or film assembly has not visually grown wider, the main direction of stretching has been formed under a small angle to the machine direction. This is explained by the shear, which takes place when the film is pulled off from the grooved rollers, and it is believed to have some importance for the m.d. tear propagation resistance.

A close visual study, best under magnifying glass or m rmcroscope, shows a very fine pleating of the stretched sequences, with pleats extending almost but not quite parallel with the m.d. (see the microphoto FIG. 6). This almost invisible pleating gives the product a pleasant, relatively warm feel.

From a practical point of view, this third aspect of the invention presents the advantage that no change of machine direction and no tentering frame or similar are needed, whereby the set up of machinery also will require less space.

Fourth Aspect of the Invention

The first 3 prior-art patent applications mentioned at the beginning of this specification deal with or mention the creation of strong bond/weak bond or strong bond/no bond patterns in sequentially stretched laminates, claiming and demonstrating that such patterns of bonding are highly advantageous for tear propagation resistance.

The fourth aspect of the present invention concerns a method and product which is believed to present further advantages in this respect. Here the lamination process is substituted by a special co-extrusion process. This process forms a film or a group of mutually strongly bonded films (A) on one side, and a film or group of strongly boned films (B) on the other side of the co-extrudate and optionally a layer or group of layers (C) to act as bonding control between (A) and (B). (C) is thinner than each of the films or groups (A) and (B). This film product is stretched in one or a plurality of stretching steps, where at least one step is carried out sequentially.

The components in the co-extrusion are selected such that, in the final film product, (A) and (B) are so weakly bonded together that they can be peeled apart. That weak bonding is obtained by selecting (C) so that it fails cohesively during peeling of the final film product, but still bonds adhesively to (A) and (B). Furthermore, the composition of the assembly and the process conditions are such that, either (A) and (B) exhibit different coefficients of elasticity (E) in each direction within each region, formed by the sequential stretching, or (A) and (B) exhibit different directions of orientation within each segment, or the compositions and process conditions are selected to produce the effect that the segmental stretching totally or practically destroys the bonding within the mostly stretched series of segments. In each case, a split will tend to propagate in different directions in the two films or group of films (A) and (B). The final film product, so to say, behaves as a "pseudo cross-laminate".

There is a third option, namely that the compositions and process conditions are selected to produce the effect that the segmental stretching totally or practically destroys the bonding within the mostly stretched series of segments. Also in that case a split will tend to propagate differently in the two films or group of films (A) and (B).

The three different options can be combined.

The fourth aspect of the invention is more precisely defined in method aspects set forth in the Third and Fourth Processes of the Summary of the Invention, and in film product set forth in the First Film of the Summary of the Invention.

Compared to the known art in which laminates are produced using strong bonds/weak bonds, or strong bonds/no bonds, this fourth aspect of the present invention presents an obvious advantage, namely that the produced film product can be much thinner, but also for thicker materials there are advantages. One is that the installation and running of the coextrusion process followed by the stretching as an in-line process is simpler than the installation and running of an in-line procedure comprising extrusion from two separate dies plus lamination and stretching. Finally the melt orientation will be lowest in the claimed procedures when all other parameters are generally even. This is due to the fact that the melt orientation, very generally speaking, is limited to the longer molecules and restricts the possibilities for stretching after solidification, and therefore has a negative effect on tear propagation resistance and on the depth of puncture.

As one of the conditions for the method according to the fourth aspect, it is stated above that the films or film groups (A) and (B) in the final product are so weakly bonded together that they can be peeled apart. When testing this by trying to peel from one edge, the peeling may be started under use of adhesive tape. Two tapes may be joined with the edge part of the laminate bonded between the tapes. The two tapes are then peeled apart and may start peeling of the laminate. If that does not happen, two plastic tapes are laid on top of each other with the laminate between at one end. Each tape must be heat sealable to the laminate. Heat-sealing is carried out while direct bonding between the two tapes is avoided. Then peeling is tried by help of the two tapes. If peeling of the laminate is still not possible, it is judged that the laminate is not peelable.

Fifth Aspect of the Invention

The fifth aspect of the present invention concerns a method of producing a segmentally stretched film or assembly of films with nap-like surfaces. The main aim is to give the product a warm textilish feel and a textilish look. During the last 40 years or so, several methods have been proposed to make "napped film", but to the knowledge of the inventor, no such method has been industrialized. According to the fifth aspect of the invention a film or an assembly of films is sequentially stretched between a pair of grooved rollers (101) and (102) of which the grooves either are circular or helical, and in an important embodiment dealt with below, further has been modified by indentations on the crests. In this process the film or the film assembly is stuffed into the nip between the two rollers. This means the film or film assembly is supplied with a fine traverse waving either prior to or while entering the nip. By the passage through the nip, the waving becomes fully or partly eliminated in the segments which become oriented by the stretching, whereas the waving is maintained in segments which do not become oriented. Thus, the straightened-out segments stabilize the waving of the other segments.

Figure 7A:
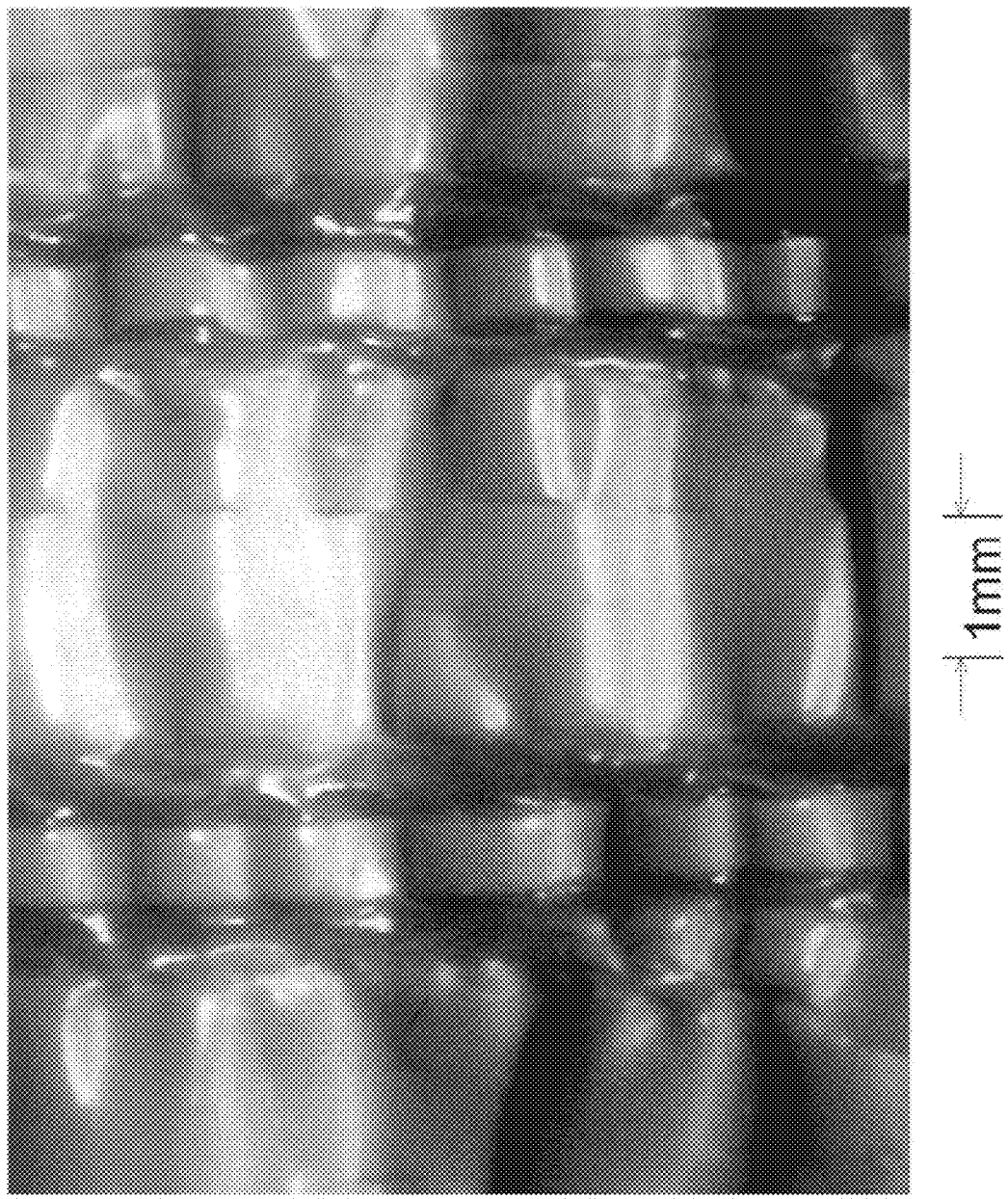
FIGS. 7a&b depict microphotos showing the "stuffed" product obtained by the fifth aspect of the invention.

This is best understood by a study of the microphotos FIG. 7a and FIG. 7b. FIG. 7a shows a film which has been stuffed to 85% of its original length and FIG. 7b shows a film which has been stuffed to 50% of its original length. The stuffing is stabilized by longitudinally extending regions which have been stretched mainly in the transverse direction (but in FIG. 7b somewhat biased). This produces a very efficient "nap" effect without harming the strength properties. Furthermore, the product shows deep penetration when it is punctured with a horn.

Very interesting product structures obtained by the fifth aspect of the invention are described under second product embodiments and third product embodiments. It is noted that the bosses obtained by sequential stretching normally are thinner than the rest of the film, but in this fifth aspect of the invention it is opposite. Thereby the "nap" on the film better resists bending.

The elastic character mentioned under second product is found to be a result of the combined m.d. stuffing and sequential t.d. stretching of film, which originally mainly exhibited an m.d. orientation (e.g. formed by the take-off from the extruder). This elastic character is advantageous is several products. The "Zig-Zagging" structure mentioned under third product is described above.

Sixth Aspect of the Invention

Many of the embodiments of the different aspects of the present invention uses grooved rollers which additionally are supplied with indentations on the crests. In order to reduce the price of manufacture, a small diameter is preferable. This can conveniently be achieved by the described conveyor system, which in itself is simple and inexpensive.

For an industrial machine, the length of the two grooved rollers must normally be at least 500 mm, and this means that the carrying out of the sixth aspect of the invention normally will require that rollers of such a small diameter must be roller-supported at least over one or more parts of their length. To the knowledge of the inventor, it is not known art to roller support grooved rollers.

In certain embodiments, the support should consist of several short support rollers, which are assembled along the length of the grooved roller which they support, such that the axes of the short rollers are mutually displaced to nest the grooved rollers. If such support roller is used to support a circular grooved stretching roller with indented crests, the short support roller should preferably have a corresponding grooved surface with crests fitting into the grooves of the grooved stretching roller, such that the support acts on the bottoms of the grooves, of the stretching roller. The purpose is to minimize the wear on the support roller.

Figure 2:
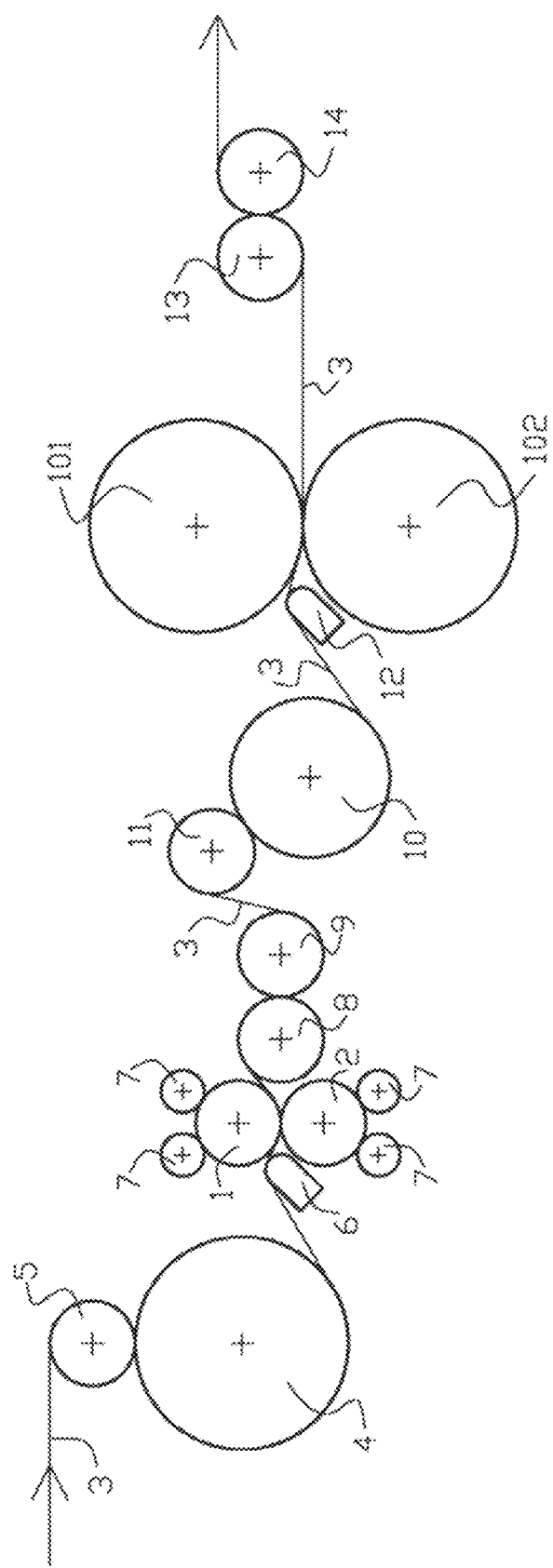
FIG. 2 depicts a principal sketch showing in-line manufacture combining all aspects, except that the extrusion and first longitudinal stretching step are not included.

In this connection reference is made to International Patent Application PCT/EP2010/056220 (Rasmussen) see especially the photo FIG. 2 and the description in this connection.

The Immediate Following Description Concerns All Six Aspects of the Invention

It is well known to form internal voiding in a film during stretching by admixture of suitable fine particles, e.g., consisting of $CaCO_3$ or talc. The use of such technology in connection with segmental stretching is described and claimed in 4 of the publications mentioned at the beginning of this specification, namely the two B orchard et al publications, the Dorsey et al publication, and the Rasmussen and Rasmussen publication. As mentioned in each of these publications, the voiding may either go through the entire film or assembly of films, or may be limited by inclusion of a non-voided layer. In both cases it causes a whitening of the film product whereby the relatively high cost of pigmentation is avoided and decorative patterns can be obtained corresponding to a stretched I not stretched structure. If the voiding is through-going, it also makes the film product breathable, and thereby suitable for certain sanitary textiles.

In similar way and for similar purposes, a through-going or non-through-going voiding can also with advantage be applied in film manufactured under use of any of the 6 aspects of the present invention.

The publications referred to at the beginning of this specification also mention that segmentally stretched film, due to advantageous strength/weight relations are suitable for manufacture of low-weight bags. In this connection these publications emphasize the use as film for garbage bags and food bags, since segmentally stretched film can be made with advantageous tear propagation and puncture resistance properties. This is also true for film and film assemblies made according to any of the 6 aspects of the present invention.

The said publications further mention the use in sanitary products. Here the look and feel and—in most cases—through-going porosity is of essence. All these properties can be achieved by suitable adaption of each of the aspects of the invention. Flexibility is created by the thinner segments, warm feel by waved segments, and through-going porosity by agents for internal cracking.

A sequentially stretched product according to any of the six aspects of the inventions may become after-laminated, in particular cross-laminated. Each of the aspects will or may lead to the formation of waved segments. In that case a crosslamination is preferably carried out in such a way that a flattening of the waves is avoided. A method of achieving this is described and claimed in Int. Pat. Appl. PCT/EP/2010/059751 to RASMUSSEN product claim 16, method claim 23 and FIG. 3. These disclosures are included herein by reference.

Each of the 6 aspects of the present invention is suitable for manufacture of film products based on virtually any cold-stretchable thermoplastic polymer, but since most of the end products are relatively cheap commodities, the cheaper polymers such as LLDPE, HDPE and PP are of particular interest. LDPE is also applicable but not preferable due to its relatively low cold-stretchability.

It is noted that degradable polymers, e.g., thermoplastic modified starch, also are applicable in connection with each of the aspects, and may possibly become of importance for the invention.

As it shall be further described below, the fifth aspect of the invention may find use for more expensive textile products, and in that case polymers such as polyamides and polyesters may become preferable as raw materials.

Different Embodiments of Each of the Six Aspects of the Present Invention Shall Now Be Described It has been described above how the first aspect solves the problem of spiralized grooved rollers dragging the film or film assembly to one side, either by forming fine indentations in the crests of at least one of the grooved rollers, or by arranging a counter-dragging effect in front of the grooved rollers, or by both means.

In one embodiment of this aspect, the depth of the indentation is less than or equal to 50% of a dimension of the mutual intermeshing of the crests of the rollers (1) and (2) and preferably the depth of the indentation is less than or equal to 25% of a dimension of the mutual intermeshing of the crests of the rollers (1) and (2).

Preferably, these indentations comprise fine second grooves m the crests disposed substantially perpendicular to the first grooves in the roller.

Depending on the stretchability of the polymer materials, this biased stretching may take place at an ambient temperature, or a higher temperature may be needed. As specified in aspects of the First Process of the Summary of the Invention, the use of a higher temperature may be used (original claim 4). Thus, it was found that film based on LLDPE without any problem could be subjected to the biased stretching at an ambient temperature, while film based on HDPE required a much higher temperature, preferably between about 80° and 90° C.

Similarly, the film to be subjected to the biased stretching may exhibit an orientation limited to the orientation it received by the extrusion and draw down, or the manufacture may include a step of longitudinal stretching prior to the biased stretching. This is specified in aspects of the First Process of the Summary of the Invention. The choice depends on the degree of orientation achieved by the hot draw-down.

Preferably the crests on the first grooved rollers have two distinct, substantially helical edges. (When the crests are indented, the edges cannot be exactly helical). The aim of this is to produce a distinct border between stretched and unstretched sequences.

The following concerns the second aspect, i.e., the aspect which solves the problem of adjusting the positions of the two helically grooved rollers to each other. It was mentioned above that one option is to allow one of the rollers axial sliding. It was also mentioned that when no further precaution is taken, a self-adjustment of this roller will occur and make the sequential stretching relatively even, but not perfectly even. According to an embodiment of this aspect, there can be established, by different means, a controllable axial force on the slidable roller, and thereby the evenness of the sequential stretching can be adjusted to perfection. This is more exactly defined in the Second Process of the Summary of the Invention.

Also in this aspect of the invention, each of the crests on the grooved rollers should preferably show two distinct, substantially helical edges. As it is stated above, and is demonstrated by the microphotos FIG. 5a and FIG. 5b, stretching between circular grooved rollers of a longitudinally oriented film, always becomes less even than a similar angular stretching, in which the angle between the original direction of stretching and the direction of the sequential stretching is substantially lower than 90°. On the other hand, the former method has the advantage, that it is possible to feed side-portions of the film or film assembly unstretched through the grooved roller machine by avoiding mutually intermeshing crests over some lengths of the grooved rollers, which the film or film assembly passes. This has importance, e.g., when the produced film product is used for bag making and in this connection must be heat sealed.

However, an almost similar advantage can be achieved by use of the third aspect of the invention, i.e., the aspect in which the film assembly is pulled off from the spiralized grooved rollers in the machine direction and hereby is after-stretched in this direction without allowing any essential transverse contraction. To obtain the wanted heat-sealability, one or both of the grooved rollers are made without grooves within one or more cylindrical sections. In this way, the stretching of a section at one or both sides of the film or film assembly can be limited to the m.d. stretching after passage of the grooved rollers, and the ratio of this stretching can and should normally be no higher than about 1.6:1.

It was found that such side sections hereby became stretched between about 2% and 4% less than the rest of the film, but it is believed that this difference can become eliminated by a localized, very mild after-stretching of the side sections between mutually intermeshing gear rollers.

The same principle can also be used to build up one or both of the spiralized grooved rollers from segments. Thus, a narrow cylindrical section where two segments contact each other is made without grooves, and the segments which contact each other are made axially slidable on a core of this roller, and made to follow the rotation of the core.

The forth aspect of the present invention comprises many embodiments. This is the aspect in which a strong bond/weak bond lamination carried out between the sequentially stretching grooved rollers is substituted by a selected coextrusion process followed by the sequential stretching. In one embodiment, the bonding layer or group of bonding layers (C) has high contents of a particle formed additive producing internal voiding. The choice of polymer material or polymer materials for (C) should preferably be selected to make the bond strong, were it not for the internal voids.

This is an efficient means to control the capability of the final product to become peeled apart, as requested in this aspect of the invention. Furthermore, this embodiment presents the advantage that the voids will become closed by heat sealing, thus the peel-ability will become eliminated in a heat-seal.

Depending on the melt orientation formed by the coextrusion process, it may be advantageous to carry out a substantially continuous m.d. stretching below the melting range prior to the sequential stretching. M.d. stretching here means the machine direction of the extrusion.

Suitable choices of polymer compositions, and suitable directions of orientations in different series of segments of the film or film assembly are stated in fourth process embodiment.

The fifth aspect of the invention, i.e., the aspect in which the film or film assembly is stuffed into the nip between two grooved rollers, can be carried out by two, principally different procedures.

In one procedure, the stuffing is carried out as a separate step, e.g. between rubber belts, which engage the film or film assembly, while they contract from a longitudinally strongly strained state to a less strained state. The subsequent sequential stretching may be carried out either between cylindrically grooved or spirally grooved rollers.

In the other usually preferable procedure, the stuffing is carried out while the film or the assembly enters the nip by choosing the grooved rollers, as circular grooved rollers which are modified by indentations on the crests and rotating one of the rollers at a circumferential velocity essentially higher than a circumferential velocity of the other roller. At the entrance to the nip, the film or assembly is frictionally engaged with the faster roller sufficiently to feed the film or the assembly into the nip at a velocity which is higher than the velocity of the slower roller.

To achieve this, the crests of the latter roller are supplied with indentations sufficient to reduce the velocity of the film or the assembly, and, optionally to bring the film or the assembly to follow the velocity of the slower roller.

In this embodiment of the fifth aspect of the invention, the frictional engagement of the film or assembly with the faster roller is preferably established by supplying the crests of this roller with smooth indentations preferably essentially of wave form. Hereby, the smoothness must be sufficient to allow harmless sliding of the stuffed film or assembly over the indented crests while the stuffed film or assembly is in strongly tentered state due to the transverse stretching.

This aspect of the invention can with special advantage be used to make certain sanitary textile products and other products of a testilish character in particular breathable products. To this end, the stretched parts of the manufactured film can be made breathable by addition of microvoid forming particle, such as e.g. $CaCO_3$, to the polymer material.

The process according to the fifth aspect of the invention can in many cases with advantage be carried out as a continuation of the first, second and third aspect.

Original Claims

A process of segmentally stretching a film or assembly of films comprising the steps of feeding the film or the assembly of films under longitudinal tension in a nip between mutually intermeshing, rotating first grooved rollers (1) and (2) having first helically shaped grooves making an angle between 10 degrees (10°) and 75 degrees (75°) with a roller axis, stretching the film or the assembly as it passes through the first grooved rollers (1) and (2), and counteracting a screwing effect of the helically shaped grooved rollers. The screwing effect tends to move the film or the assembly to a first side as the film or the assembly passes through the rollers and where the counteracting step comprises (a) supplying fine indentations on crests of one or both of the grooved rollers (1) and (2) to establish a frictional resistance to the screwing effect, or (b) immediately in front of the nip, passing the tentered film or the assembly over a roller having fine helical grooves adapted to give the film or the assembly a tendency to move in a direction opposite to the first side, or (c) immediately in front of the nip, passing the tentered film or the assembly over a rounded surface of a fixed bar, where the rounded surface includes fine angularly directed grooves adapted to give the film or the assembly a tendency to move in a direction opposite to the first side, or (d) supplying fine indentations on crests of one or both of the grooved rollers (1) and (2) to establish a frictional resistance to the screwing effect and immediately in front of the nip, passing the tentered film or the assembly over a tentering roller having fine helical grooves adapted to give the film or the assembly a tendency to move in a direction opposite to the first side, or (e) supplying fine indentations on crests of one or both of the grooved rollers (1) and (2) to establish a frictional resistance to the screwing effect and immediately in front of the nip, passing the tentered film or the assembly over a rounded surface of a fixed bar, where the rounded surface includes fine angularly directed grooves adapted to give the film or the assembly a tendency to move in a direction opposite to the first side.

The indentations have a depth less than or equal to 50% of a dimension of the mutual intermeshing of the crests of the rollers (1) and (2) and preferably the depth of the indentation is less than or equal to 25% of a dimension of the mutual intermeshing of the crests of the rollers (1) and (2). The indentations comprise fine second grooves in the crests disposed substantially perpendicular to the first grooves in the roller. The process further comprising heating the film or the assembly to a first stretching temperature before meeting the grooved stretching rollers (1) and (2), and maintaining the grooved stretching rollers (1) and (2) at a maintenance temperature substantially lower than the first stretching temperature so that the film or the assembly becomes cooled in regions, where the film or the assembly contacts the grooved stretching rollers (1) and (2). The process further comprising the step of prior to the feeding step, evenly or segmentally stretching the film or at least one of the films of the assembly substantially in a longitudinal direction at a second stretching temperature below a melting temperature of the film, preferably the second stretching temperature is substantially at ambient temperature. Each crest on the first grooved rollers has two distinct, substantially helical edges.

A process of sequentially stretching a film or assembly of films comprising the steps of feeding the film or the assembly of films in a nip between mutually intermeshing, rotating grooved rollers (1) and (2), where the grooves are helically shaped under an angle between 10 degrees (10°) and 75 degrees (75°) to a roller axis, and where a first position of the crests on one of the grooved rollers relative to a second position of the crests on the other grooved roller is variable and adjustable, driving the two rollers independently of each other via adjustable motors so that a speed of each roller may be adjusted independently, or allowing one of the rollers (1) and (2) to slide axially. A controllable axial force is exerted on the slidable roller by a spring controlled means, a pneumatic means, or a hydraulic means. Each of the crests on the grooved rollers has two distinct, substantially helical edges.

A process of sequentially stretching a film or assembly of films comprising the steps of feeding a film or a assembly of films in a machine direction under longitudinal tension into a nip between mutually intermeshing, rotating first grooved rollers (1) and (2) with first grooves, where the first grooves are helically shaped under an angle between 10 degrees (10°) and 75 degrees (75°) to a roller axis, sequentially stretching the film or the assembly as it passes through the first grooved rollers (1) and (2), and pulling off the film or the assembly from the grooved rollers (1) and (2), while being stretched in the machine direction and while a transverse contraction substantially is avoided, the machine direction stretching being carried out between the grooved rollers and at least one roller closely spaced to the first grooved rollers. One or both of the first grooved rollers within one or more cylindrical sections are without grooves to avoid any angular stretching in one or more longitudinally extending regions of the film or assembly. The avoidance of angular stretching comprises one or both sides of the film or assembly. One or both of the grooved rollers (1) and (2) are composed of segments, and a narrow section where two segments contact each other are without grooves, and the segments which constitute one of the grooved rollers are made axially slidable on a core of this roller.

A process of producing a film product, comprising the steps of coextruding an assembly of thermoplastic polymer films, where one side of the assembly comprises a film or a group of mutually strongly bonded films (A) and the other side comprises a film or a group of mutually strongly bonded films (B), and in one or a plurality of stretching steps the assembly of films is stretched at a stretching temperature below a melting temperature range of the films, where at least one of the stretching steps is carried out sequentially via circularly, helically or axially grooved rollers to produce at least one series of segments (G) and another series of segments (F), where the segments (F) are stretched to a lesser degree than the segments (G) or the segments (F) are left with an orientation substantially the same as an orientation of the assembly before the sequential stretching, where the composition of the assembly and the process conditions are selected so that (A) and (B) in the final film product are weakly bonded together such that they can peeled apart, this weak bonding being made by application of a bonding layer or group of bonding layers (C) of a lower thickness than each of the films or group of films (A) and (B), where the composition of (C) is selected so that it bonds adhesively to both (A) and (B) but fails cohesively during peeling of the final product, and where the composition of the assembly and the process conditions are selected so that at least one of the following three conditions are satisfied in the final film product: (A) and (B) exhibit different coefficients of elasticity (E) in each direction within each segment, (A) and (B) exhibit different directions of main orientation within each (F) segment or each (G) segment or within each (F) segment and each (G) segment or the sequential stretching totally or practically destroys the bonding within the (G) series of segments, while the bonding within the (F) series of segments remains sufficient to make the film product an integral product. The low cohesive strength in (C) is achieved by admixture of an micrograin formed agent for internal voiding during stretching. The low cohesive strength m (C) 1 s achieved by admixture of an incompatible polymer. The sequential stretching converts (C) to a fibre network. The sequential stretching is preceded by a substantially continuous stretching below a melting range along a machine direction of the extrusion.

A film product compnsmg a coextruded sequentially stretched assembly of thermoplastic polymer films, where one side of the assembly comprises a film or a group of mutually strongly bonded films (A) and the other side comprises a film or mutually strongly bonded films (B), where the sequential stretching has formed at least two differently stretched series of segments (F) and (G) interspersed with each other, the (G) segments being more orientated than and thinner than the (F) segments, where each (F) segment and each (G) segment in each of the films or film groups (A) and (B) have a main direction of molecular orientation and the main direction of orientation in each (F) segment forms an angle (u) having a value between 5° and 90° inclusive to a main direction of orientation in an adjacent (G) segment, where (A) and (B) are weakly bonded together such that they can be peeled apart, this bonding being through a bonding layer or group of bonding layers (C) of a lower thickness than each of the films or group of films (A) and (B), and wherein at least one or the other or both of the following three conditions are satisfied (A) and (B) exhibit different coefficients of elasticity (E) in each direction within each segment, (A) and (B) exhibit different directions of main orientation within each (F) segment or within each (G) segment or each (F) segment and each (G) segment, or the bonding is totally or practically destroyed within the (G) series of segments, while the bonding within the (F) series of segments remains sufficient to make the film product an integral product. The cohesive failure in (C) has transformed (C) to a fibrous network. Each of the segments in the series (F) and each segment in the series (G) extend linearly and are mutually parallel. The angles (u) have a value are between 15°-75°. The (A) film includes more than 55% HDPE and the (B) film includes more than 55% LLD PE or LDPE or both. The film (A) includes more than 55% PP and the film (B) includes more than 55% polyethylene type. The film (A) is a group of films comprising a lower melting heat-seal layer on a surface of the film product. The film (B) is a group of films comprising a lower melting heat-seal layer on a surface of the film product.

A process of orienting by sequentially stretching segments of a film or film assembly in a nip between two circularly or helically mutually intermeshing grooved roller (101) and (102), or such grooved rollers which are modified by indentations on the crests in which the film or the assembly is stuffed into the nip by being supplied with a fine traverse waving either prior to or while entering the nip, and by the sequential stretching, which takes place during the passage through the nip, the waving becomes fully or partly eliminated in the segments which become oriented by the stretching, whereas the waving is essentially maintained in segments which do not become oriented, and is stabilized by a contraction in the stretched segments. The stuffing is carried out as a separate step. The stuffing occurs between rubber belts which engage the film or the assembly, while they contract from a longitudinally strained state to a less strained state. The stuffing is carried out while the film or the assembly enters the nip by choosing the grooved rollers (101) and (102) as circular grooved rollers with indentations on the crests modified for adequate frictional control and rotating one of the rollers (101) at a circumferential velocity essentially higher than a circumferential velocity of the other roller (102), and at the entrance to the nip frictionally engaging the film or the assembly with the faster roller (101) sufficiently to feed the film or the assembly into the nip at a velocity which is higher than the velocity of the slower roller (102), whereby crests of the latter roller are supplied with indentations sufficient to reduce the velocity of the film or the assembly, preferably to bring the film or the assembly to follow the velocity of the slower roller (102). The frictional engagement of the film or assembly with the faster roller (101) is established by supplying the crests of this roller with smooth indentations, preferably essentially of wave form the smoothness being sufficient to allow harmless sliding of the stuffed film or assembly over the indented crests, while the stuffed film or assembly is in a strongly tentered state due to the transverse stretching. The grooved rollers (101) and (102) has a diameter equal to or lower than 70 mm. The process further comprising prior to the sequential stretching performing one or more of the above described process steps. The stretched parts of the manufactured film is made breathable by addition of microvoid forming particles to the polymer material.

A film product comprising waved narrow linearly first sequences extending in the machine direction with a main direction of orientation in this direction, the waves establishing a stuffing in this direction and there between narrow lineary substantially flat second sequences with a main direction of orientation substantially perpendicular to the machine direction, the first sequences being thicker than the second sequences, and the depth of the waving being such that at least 20%, preferably 30% stretching, and more preferably 40% stretching in the machine direction is required to eliminate essentially all waving. A transverse test stretching in the machine direction sufficient to eliminate essentially all waving has elastic character, such that the film can revert to the state which it had before the test stretching. The first and second linearly sequences are narrower than 5 mm, preferably narrower than 2 mm, and still more preferably narrower than 1 mm.

A product compnsmg waved narrow first sequences extending in the machine direction with a main direction of orientation in this direction, the waves establishing stuffing in this direction, and there between second sequences oriented under oblique angle between 45°-85° to the machine direction, this having zig-zagging character when comparing the orientation on either side of each first sequence. The product being microporous.

A process of sequentially stretching a film or film assembly between mutually intermeshing first and second grooved rollers, which either have circular grooves or spiralized grooves with the spirals extending under an angle between 90° and 20° to the axes of the rollers, in which process the diameter of at least the first grooved rollers is 70 mm or less on which circular or spiralized grooved roller or rollers the crests may be supplied with indentations, and in which process any such roller with a diameter equal to or lower than 70 mm is supported against the pressure created by the sequential stretching by at least one short support roller on one side of the grooved roller and one short support roller on the other side of the grooved roller, arranged to nest the grooved roller. At least the circumferential surfaces of the short support rollers comprises a wear resistant polymer material. The short support rollers are used to support a circular grooved stretching roller with indented crests, and the short support roller has a corresponding grooved surface with crests fitting into the grooves of the grooved stretching rollers, such that the support acts on the bottoms of the grooves of the stretching roller.

The film product (P) manufactured therewith is afterlaminated with another film product (O), preferably to form a crosslaminate. The produced film product (P) comprises waved sequences, and the film product (O) is formed and laminated to the film product (P) by an extrusion coating process, whereby the lamination is established as spot bonding localized to crown portions or base portions of some or all of the waved sequences.

An apparatus suited for carrying out any of the processes described above.

Apparatus for segmentally stretching a film or assembly of films comprising a pair of mutually intermeshing, rotating first grooved rollers (1) and (2) having first helically shaped grooves making an angle between 10 degrees (10°) and 75 degrees (75°) with a roller axis, said pair forming a nip; means for feeding the film or the assembly of films under longitudinal tension to the said nip; means for stretching the film or the assembly as it passes through the first grooved rollers (1) and (2), and means for counteracting a screwing effect of the helically shaped grooved rollers, which tends to move the film or the assembly to a first side as the film or the assembly passes through the rollers said counteracting means comprising (a) fine indentations on crests of one or both of the grooved rollers (1) and (2) that establish a frictional resistance to the screwing effect, or (b) immediately in front of the nip, a roller having fine helical grooves over which the film or assembly is passed such that the film or the assembly is given a tendency to move in a direction opposite to the first side, or (c) a rounded surface of a fixed bar immediately in front of the nip, over which the tentered film or the assembly is passed, where the rounded surface includes fine angularly directed grooves adapted to give the film or the assembly a tendency to move in a direction opposite to the first side, or (d) fine indentations on crests of one or both of the grooved rollers (1) and (2) to establish a frictional resistance to the screwing effect and immediately in front of the nip, a tentering roller having fine helical grooves over which the tentered film or the assembly is passed to give the film or the assembly a tendency to move in a direction opposite to the first side, or (e) fine indentations on crests of one or both of the grooved rollers (1) and (2) to establish a frictional resistance to the screwing effect and immediately in front of the nip a rounded surface of a fixed bar, over which the tentered film or the assembly is passed, where the rounded surface includes fine angularly directed grooves adapted to give the film or the assembly a tendency to move in a direction opposite to the first side.

Apparatus for sequentially stretching a film or assembly of films comprising mutually intermeshing, rotating grooved rollers (1) and (2), where the grooves are helically shaped under an angle between 10 degrees (10°) and 75 degrees (75°) to a roller axis forming a nip therebetween, wherein a first position of the crests on one of the grooved rollers relative to a second position of the crests on the other grooved roller is variable and adjustable, means for feeding the film or the assembly of films to the said nip, adjustable motors that drive the two rollers independently of each other so that a speed of each roller may be adjusted independently, or means for allowing one of the rollers (1) and (2) to slide axially.

Apparatus for sequentially stretching a film or assembly of films comprising mutually intermeshing, rotating first grooved rollers (1) and (2) with first grooves, where the first grooves are helically shaped under an angle between 10 degrees (10°) and 75 degrees (75°) to a roller axis forming a nip therebetween, means for feeding a film or assembly of films m a machine direction under longitudinal tension into the said nip; means for sequentially stretching the film or the assembly as it passes through the first grooved rollers (1) and (2), and means for pulling off the film or the assembly from the grooved rollers (1) and (2), and for stretching the film or assembly in the machine direction comprising at least one roller closely spaced to the first grooved rollers, and means for substantially avoiding a transverse contraction.

Apparatus for producing a film product, comprising coextrusion means for coextruding an assembly of thermoplastic polymer films, where one side of the assembly comprises a film or a group of mutually strongly bonded films (A) and the other side comprises a film or a group of mutually strongly bonded films (B), and means for carrying out one or a plurality of stretching steps for is stretched the assembly of films at a stretching temperature below a melting temperature range of the films, where at least one of the stretching means comprises circularly, helically or axially grooved rollers that produce at least one series of segments (G) and another series of segments (F), where the segments (F) are stretched to a lesser degree than the segments (G) or the segments (F) are left with an orientation substantially the same as an orientation of the assembly before the sequential stretching, the sequential stretching totally or practically destroys the bonding within the (G) series of segments, while the bonding within the (F) series of segments remains sufficient to make the film product an integral product.

Apparatus for sequentially stretching a film or film assembly comprising mutually intermeshing first and second grooved rollers, which either have circular grooves or spiralized grooves with the spirals extending under an angle between 90° and 20° to the axes of the rollers, wherein the diameter of at least the first grooved rollers is 70 mm or less on which circular or spiralized grooved roller or rollers the crests may be supplied with indentations, and wherein any such roller with a diameter equal to or lower than 70 mm is supported against the pressure created by the sequential stretching by at least one short support roller on one side of the grooved roller and one short support roller on the other side of the grooved roller, arranged to nest the grooved roller.

A product manufactured by use of any of the processes described above.

Further Description of the Process Set Forth in the Figures

Figure 1:
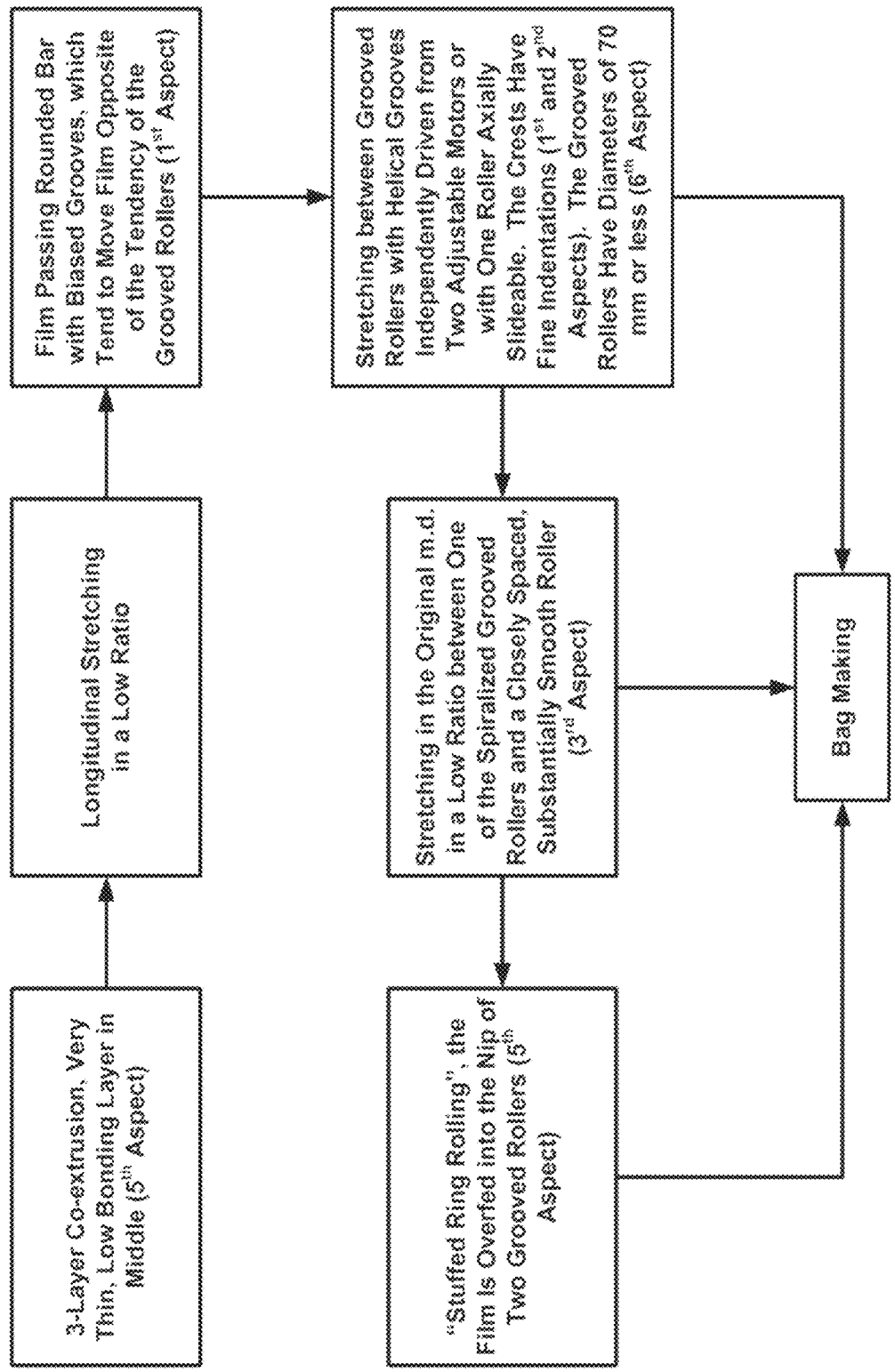
FIG. 1 depicts a flow sheet illustrating different combinations of the 6 aspects of the invention.

With reference to the process line shown in the flow sheet of FIG. 1 and the principal sketch FIG. 2, the process may start with extrusion and longitudinal stretching preferably in a low ratio, e.g. between 1.3 to 1 and 1.6 to 1. These two steps are shown only in the figures. To imitate and improve the known technology of segmental stretching of a laminate, in which this stretching causes bonding in segments only, this extrusion is preferably a coextrusion in which a thin middle layer provides a bonding which is so weak that the final film product can become peeled apart into its two half parts. Further conditions are specified in the general description.

In line with the extrusion and longitudinal stretching, the film (3) goes to a biased stretching step between the grooved rollers (1) and (2), in which the grooves are helical, forming an angle, e.g., between 30° and 60°, to the roller axis. In certain embodiments, the film (3) is heated before the biased stretching, while the grooved rollers (1) and (2) are kept at about ambient temperature. The heating or control of film temperature is established by means of a heated and driven roller (4), which together with its counter rubber roller (5) and the grooved rollers (1) and (2) determines the tension under which the film (3) meets the grooved rollers (1) and (2).

The grooved rollers (1) and (2) tend to screw the film (3) to one side, while it approaches the nip of the grooved rollers (1) and (2), but that tendency is counteracted, in part by a shallow indentation of the crests on each of the rollers (1) and (2), and in part by a heated bar (6). The rounded surface of the bar (6) is supplied with shallow, angular grooves, which are designed so that they tend to move the film (3) to the opposite side.

The grooved rollers (1) and (2) are not in fixed mechanical position to each other. Their bearings keep them from any axial movement, but they are not coordinated by gear wheels or chain wheels. Instead, they are independently driven from two separate motors, and the effect of one motor relative to the effect of the other motor is adjustable, and should be adjusted to obtain the most even stretching.

As explained in connection with the sixth aspect of the invention, the rollers (1) and (2) are preferably made with a very small diameter. In certain embodiments, the diameter is about 30 mm. Rollers (7) are short support rollers, which are assembled along a length of the grooved roller, which they support, such that the axes of the short rollers (7) are mutually displaced to nest the grooved roller they support. Similar to the arrangement shown in the apparatus photographed in FIG. 2 of PCT/EP2010/056220 to Rasmussen.

Since the film (3) becomes stretched on a bias, the natural way to take off the film (3) from the grooved rollers (1) and (2) would be along a biased direction, seen in relation to the original machine direction.

It may be done so, there may be established a new machine direction, and after removal of longitudinal pleats by means of a tenter frame or similar, the film manufacture may be considered finalized. The film (3) may be spooled up or go directly to bag making as indicated in the flow sheet.

However, according to certain embodiments of the invention the film is forced continuously in the original machine direction under a low degree of m.d. stretching, while transverse contraction is avoided. This is done by means of the generally smooth stretching roller (8) and its rubber counter roller (9). There may be further smooth driven rollers to assist roller (8). The roller (8) has as small a diameter and is as close to the nip as practically possible. The "generally smooth" stretching rollers (8) may comprise very fine and very shallow grooves to avoid any axial sliding of the film.

Again, the film manufacture may now be considered finalized, however, there is great advantage in adding the step of Stuffed Ring Rolling as described in more detail concerning the fifth aspect of the invention. This takes place between the two circular grooved rollers (101) and (102). The tension in the film (3) is adjusted to a suitably low value by means of a roller (10) and its counter nip roller (11). In certain embodiments, there are tension control means between roller (9) and roller (11) (not shown). The roller (10) also serves to heat the film (3) to a temperature suitable for stretching. Before meeting the rollers (101) and (102), the film (3) passes over a bar (12) with rounded surface. The bar (12) may also be heated. This serves to avoid any pleating of the film (3) before it meets the rollers (101) and (102). In certain embodiments, there are very fine angular grooves in the rounded surface to increase this effect.

The roller (101) moves faster than the roller (102), e.g., between 2 times to 4 times faster. The surface of roller (101) has been given improved friction by means of shallow and rather smooth indentations, as shown in FIG. 3*a* and FIG. 3*b* and further described in this connection. Note that it has not been possible to drag the film (3) with the same velocity as the roller (101).

Figure 4B:
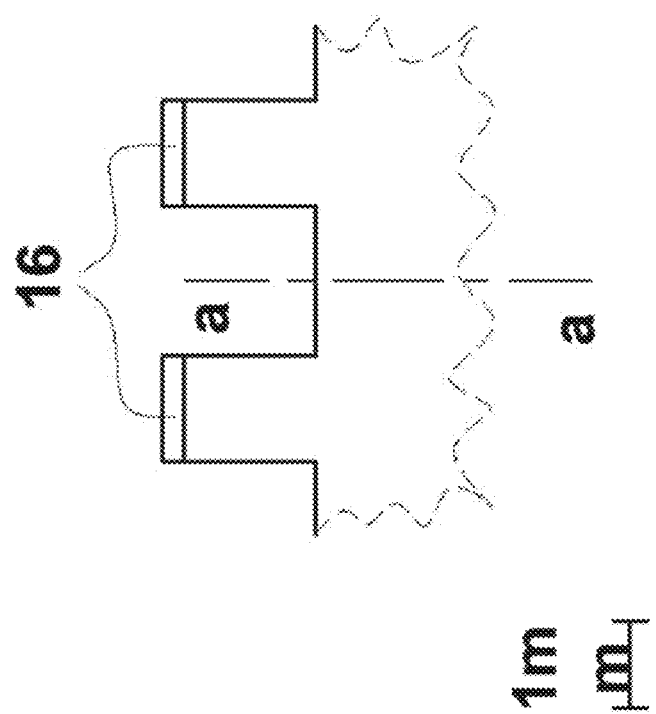
Figure 4A:
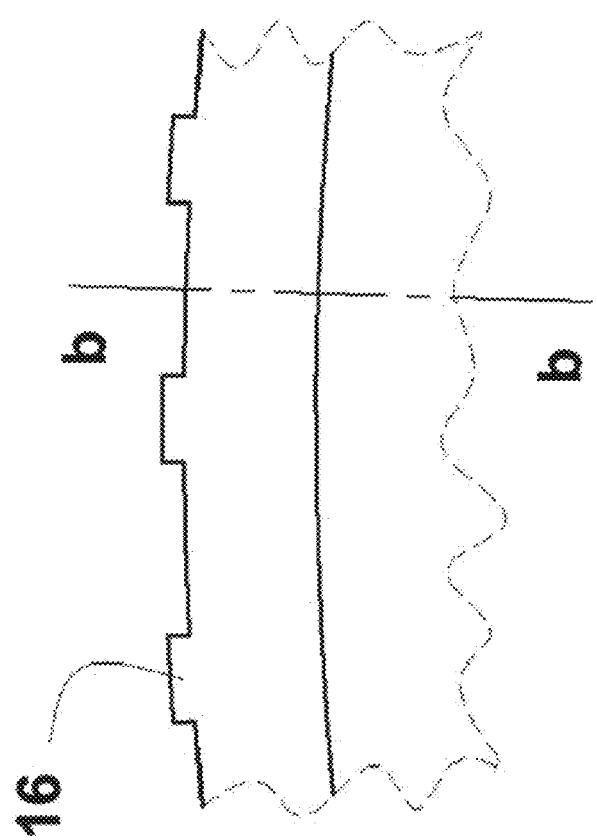
FIGS. 4a&b depict a preferable shape of indentations on a crest of the slower moving, circularly grooved roller (102) working together with the indentations shown in FIG. 3a and FIG. 3b.

The crests of the slower roller (102) are also supplied with indentations as illustrated in FIG. 4*a* and FIG. 4*b* and further described in this connection. In certain embodiments, the film (3) follows the slower roller (102), when it leaves the nip.

The "stuffing" makes the film (3) waved. By the transverse stretching between the rollers (101) and (102), this waving disappears in longitudinal segments, or becomes biased and insignificant, but the waving is maintained between these t.d. stretched segments as shown in the microphotos of FIG. 7*a* and FIG. 7*b*.

Finally, the film (3) is taken off by means of a roller (14) and its rubber counter roller (13). The film (3) has now become subjected to all five aspects of the present invention and is spooled up or goes directly to bag making.

The surface profiles of the circular grooved rollers shown in FIG. 3a, FIG. 3b, FIG. 4a, and FIG. 4b are profiles which experimentally have been found advantageous to carry out the "stuffed ring rolling". Example 4, Example 5 and Example 6 have been carried out with rollers as here drawn. The width of each groove is 1.6 mm. The width of each crest on the slower roller (FIG. 4a and FIG. 4b) is 1.2 mm, while the width on the faster roller is 0.8 mm, at the top narrowed down to 0.5 mm. It is believed that tips on the faster roller preferably should be narrower than the tips of the slower roller.

The crests on the faster roller are supplied with very smooth indentations (15) of a substantially waved shape. They must be very smooth, otherwise they would tear the film, since they move much faster than the film. As here shown, the top indentation may be flat, and on both sides of this flat top, the surface-portions may form an angle of about 30° to the flat top.

Quite good results have been obtained by giving the indentations on the slower roller the same shape as shown in FIG. 3a and FIG. 3b, but in order to obtain the most even pattern of waving in the film, the shape shown in FIG. 4a and FIG. 4b is preferred.

Accordingly, the depth of indentation is 0.25 mm and the indentation is essentially straight radial. In this way, the film gets the same velocity as the slower roller. In the former case, it will still move faster than the slower roller at the end of the nip.

As it already has been mentioned, several measures have been tried in an attempt to drag the film into the nip at the same velocity as the faster roller, but in all cases the result was negative, even when the faster roller was indentated as shown in FIG. 3a and FIG. 3b. The film could be brought to follow the faster roller almost till it met the nip, but then under influence of the slower roller it lost the contact with the faster roller and formed very deep and irregular transverse pleats.

In the following examples concerning "stuffed ring rolling", and in other experiments the film met the nip practically without any tension, and the actions of the two indentated rollers determined its velocity, relative to the two rollers, and the degree of stuffing, i.e., the ratio of longitudinal compression. This ratio was measured by drawing circles on the film before the procedure. Thus it was found that stuffing strongly depends on the ratio between the circumferential velocity of the faster roller and the slower roller. At a glance, that appears strange, since under normal conditions, the friction between two solid bodies moving relative to each other, is independent of their relative velocities. However, under the present circumstances, the film gets a "kick" forward every time a tip portion on the faster roller meets a tip portion on the slower roller. At the entrance to the nip, every kick moves the film a certain small distance, which means that, the more kicks it gets per second, the faster it will move relative to the circumferential velocity of the slow roller.

However, when the film proceeds into the nip, it becomes more and more stretched, and its friction against each roller increases. Thereby the importance of each kick is reduced, and the velocity of the film relative to that of the slow roller is also reduced, i.e., the film becomes "stuffed".

It is mentioned above that in all "stuffed ring rolling" examples the film was fed practically tensionless into the nip of the grooved rollers. That would not be practical in an industrial machine. Here, there should be chosen a ratio of longitudinal compression, which is slightly lower than the ratio, which the machine is set up to handle.

The microphotos FIG. 4a and FIG. 4b, illustrate the advantages of sequentially stretching a film under an acute angle to the original direction of orientation, instead of sequentially stretching it perpendicular to that direction. A 0.016 mm thick film based on LLDPE extruded with high m.d. melt orientation and some pigmentation with $TiO_2$ (same as used in Examples 5-8) was stretched perpendicular to the melt orientation between circular grooved rollers with sharp-edged crests to produce the structure shown in FIG. 4a. In another trial it was cut under 45° prior to similar stretching. This produced the structure shown in FIG. 4b.

In all other respects the conditions were the same in the two trials. In order to get sufficient distinction between the different sequences during the microscopy, the film was laid double prior to the sequential stretching, and the microscopy was carried out between crossing polarization filters.

The width of the sharp-edged crests was 0.3 mm and the space between a crest on one roller and a neighbor crest on the other roller was 0.2 mm. In these microphotos, (17) are the 0.3 mm wide unstretched sequences which have laid on the crests, (18) and (19) are stretched sequences, and (20) are unstretched sequences which have been under the same tension as the stretched sequences (19). The microphotos speak for themselves The microphoto FIG. 6 was taken in oblique light to accentuate fine waves in the sequentially stretched regions (21). These fine waves give the product a textilish feel and seem to have some importance for the tear propagation properties. This is the product made as described in Example 8. The sequences (22) laid on the crests of the 45° spiralized grooved rollers, and in the final product, which was m.d. after stretched as explained in the example, they form an angle of about 30° to the m.d.

Figure 6:
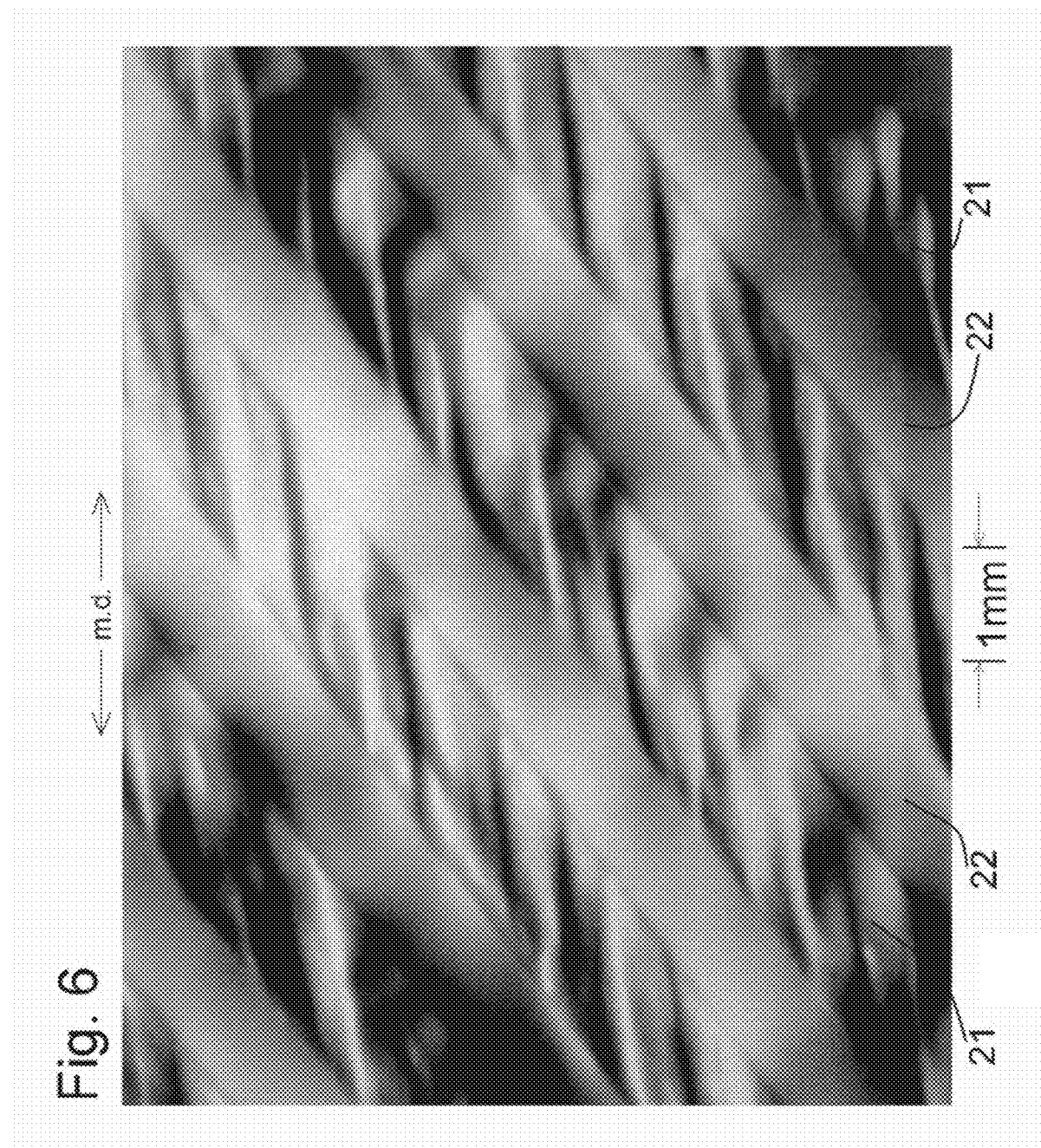
FIG. 6 depicts a microphoto of the product produced by the third aspect of the invention and shows the fine pleating obtained by this procedure.

Similar to FIG. 6 the FIG. 7a and FIG. 7b are microphotos taken in oblique light to accentuate the waving. FIG. 7a shows the product made as described in Example 5.

The circumferential velocity of the fast roller was double that of the slow roller, with the result that the product became compressed to 75% of its original length. FIG. 7b shows a product made similarly as the product shown in FIG. 7a, except that the circumferential velocity of the fast roller was 4 times that of the slow roller, with the result that the product compressed to 50% of its original length.

As it appears especially from FIG. 7b, the stretching between the grooved rollers has become biased. This is a result of the different velocities of the rollers and the indentations on the crests of both grooved rollers.

The resulting biased structure of the orientation is believed to be advantageous.

EXPERIMENTS OF THE INVENTION

Example 1, Sample A

1st Step:

A tubular film based on HDPE was coextruded. The middle layer comprises 70% of total HDPE. The top and bottom or the surface layers each comprise 15% of total LLDPE. The blow-up ratio was 1.2:1

Final film weight of the film was 31.2 grams per square meter (gsm).

$2^{nd}$ Step:

The lay-flat film was continuously all-over m.d. stretched in the ratio 1.6:1 and in line herewith m.d. cut to make several films of width 200 mm.

3rd Step:

With reference to FIG. 2, the film (3) was heated to 90° C. on the roller (4) and passes over the bar (6), which was similarly heated. The bar (6) has fine oblique grooves to counteract the sideways drag from the closely following the spiralized rollers (1) and (2). Between roller (4) and the (6), the film (3) was given the tension 50 grams/cm.

A part of the crests on the roller (1) were supplied with a fine indentation, but the film (3), which had passed this part of the roller (1) was not tested. It was, however, observed that these indentations counteract a gliding of the film over the crests.

The rollers (1) and (2) were driven together from one motor and the roller (2) was made axially slidable to make the rollers self-adjustable.

The grooves were spiral formed under 45° to the roller axis. The width of each crest was 0.8 mm, the width of each groove was 1.6 mm, and the intermeshing of the crests was 1.4 mm.

The grooved rollers were kept at an ambient temperature.

Their diameters were 100 mm, and in this laboratory machine, there was no need for support rollers.

In FIG. 2, the stretching between the grooved rollers (1) and (2) was followed by an m.d. stretching between the rollers (1) and (8), but, in this Example 1, the stretching between the spiralized grooved rollers was the last step.

The strength properties of the produced Sample A and of Sample B to Sample H made according to the following examples, are recorded in Table 1 at the end of this description of the invention.

Example 2, Sample B

The extruded film was the same as in Example 1. The manufacture of Sample B deviates from Example 1 as follows.

The m.d. stretching of the extruded film was carried out in ratio 1.4:1.

Between the 90° C. hot roller (4) and the 90° C. hot bar (6), the tension was adjusted to 25 g/cm width.

The intermeshing between the crests was 1.6 mm.

Most important, the film was m.d. after stretched between the spiralized grooved roller (1) and the smooth roller (8) in the ratio 1.4:1.

Example 3, Sample C

The extruded film and the process is the same as in Example 2, except that the after stretching between the spiralized grooved roller (1) and the roller (8) is carried out in a slightly higher ratio, namely 1.6:1.

Example 4, Sample D

The process of Example 3 was continued with a separate last step of "stuffed ring rolling" starting with the heated bar (12) and ending after the circular ring rollers (101) and (102). The intermeshing between the circular ring rollers (101) and (102) was 1.8 mm. The circular ring roller (101) runs 50% faster than the circular ring rollers (102).

The film (3) was fed almost tensionless unto the bar (12) and taken off by hand almost tensionless from the slower roller (102), which it follows as it leaves the nip. The bar (12) was heated to 60° C. The shapes of the grooves and crests with indentations appear as set forth visually in FIG. 3a, FIG. 3b, FIG. 4a, and FIG. 4b.

The axial position of the crests on the roller (102) was made self-adjusting relative to the axial position of the crests on the roller (101). This was done by making the roller (102) axially slidable. Both rollers were driven. The measure to make one grooved roller axially slidable was described above in connection with the second aspect of the present invention, but that description was limited to rollers with spiralized grooves. However, this measure is also advantageous in connection with a pair of sequentially stretching rollers with circular grooves, and is also considered inventive in this connection.

Example 5, Sample E

The extruded film was a tubular coextruded film based on LLDPE. The middle layer comprises 70% of total LLDPE. The top and bottom or the surface layers each comprise 15% of total LLDPE with about 30% of a lower melting polyethylene. The blow-up ratio was 1.2:1. Final film weight was 14.3 gsm.

The film was laminated to itself at 65° C., m.d. to m.d., to get a 28.6 gsm film. Due to a high melt orientation this was taken to the roller (4) without any pre-stretching. The rest of the manufacturing process is as in Example 4, including the "stuffed ring rolling", except that:

a) the film was not m.d. stretched after the spiralized grooved rollers (1) and (2), b) the temperature of the roller (4), the bar (6), and the bar (12) was only 50° C., and c) the intermeshing between the crests of the rollers (101) and (102) was 2.2 mm.

Example 6, Sample F

The same procedure as in Example 5 was used here, except:

a) the extruded film is not laminated to itself, b) the tension between the roller (4) and the bar (6) was 12.5 g/cm width, c) the bar (12) had ambient temperature, and d) the intermeshing between the crests on the rollers (101) and (102) was 1.8 mm Example 7, Sample G The starting film was the LLDPE-based film laminated to itself as explained in Example 5, and had a total weight of 28.6 gsm.

The procedure was as in Example 1, except:

a) no m.d. prestretching of the film, b) temperature of the roller (4) and the bar (6) was 50° C., and c) tension between the roller (4) and the bar (6) was 25 g/cm width.

Example 8, Sample H

The starting film was the LDPE-based film laminated to itself as explained in Example 5, and had a total weight of 28.6 gsm.

The procedure as in Example 2, except:

a) no m.d. prestretching of the film, b) ambient temperature of the roller (4) and the bar (6), and c) in both sides of the film, a few cm of the film extend beyond the grooved part of the rollers (1) and (2) and only receive the longitudinal stretching in ratio 1.4:1 between the rollers (1) and (8).

Comparative Test Results

In the table below, each of the Sample A through Sample H is compared with Sample I, a sequentially oriented film taken from the main part of a commercial garbage bag made by a major U.S. manufacturer, Sample J, the coextruded film, mainly consisting of HDPE, from which Sample A to Sample D were produced, and Sample K, the coextruded film, mainly consisting of LLD PE, from which Sample E to Sample H were produced.

Elmendorff tear testing was carried out according to ASTM D1922 and puncture testing according to ASTM 1306. However, the Elmendorff Tear values are relative values for comparison. The apparatus was not calibrated. The other strength values are in Newton. Puncture tests were carried out with a horn of diameter 3.3 mm and one of diameter 10.00 mm.

Each test result shown in Table 1 is an average of 5 measurements.

TABLE 1

Elmendorff and Puncture Resistant Test Results

|  | A 16.0 gsm | B 20.7 gsm | C 21.2 gsm | D 19.7 gsm | E 19.7 gsm | F 12.4 gsm | G 24 gsm | H 22 gsm | I 18.9 gsm | J 31.2 gsm | K 14.3 gsm |
|---|---|---|---|---|---|---|---|---|---|---|---|
| Elmendorff | | | | | | | | | | | |
| MD | 33.2 | 38.9 | 41.2 | 27.6 | 20.4 | 15.4 | 26.0 | 25.3 | 11.1 | 2.4 | 10.4 |
| TD | 33.3 | 59.9 | 60.8 | 29.2 | 21.0 | 16.0 | 52.4 | 51.3 | 19.2 | 74.2 | 37.0 |
| 45° | 42.2 | 60.8 | 56.0 | 29.6 | 27.6 | 15.8 | 52.4 | 45.0 | 18.3 | 62.3 | 26.3 |
| 135° | 26.4 | 47.8 | 50.8 | 32.8 | 21.4 | 10.8 | 34.0 | 39.3 | | 59.3 | 25.3 |
| Puncture | | | | | | | | | | | |
| Force [N] 3.3 mm-horn | 5.9 | 6.9 | 5.9 | 5.6 | 5.4 | 3.0 | 5.5 | 5.7 | 4.0 | 7.6 | 3.4 |
| Elongation [mm] 3.3 mm-horn | 14.6 | 14.3 | 12.3 | 15.5 | 20.8 | 22.5 | 16.3 | 31.3 | 15 | 11.6 | 14.8 |
| Force [N] 10.0 mm-horn | 16.1 | 18.3 | 17.1 | 16.3 | 13.6 | 7.4 | 14.1 | 15.8 | 10.6 | 18.8 | 7.5 |
| Elongation [mm] 10.0 mm-horn | 21.4 | 24.0 | 22.8 | 24.5 | 34.3 | 34.5 | 28.0 | 18.5 | 26.6 | 20.3 | 29.3 |

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. A process of orienting a film or assembly of films comprising:
    stuffing the film or the assembly into a nip between two circularly or helically mutually intermeshing grooved rollers, grooved roller (101) and grooved roller (102), where the film or the assembly obtains a fine traverse waving either prior to or while entering the nip,
    sequentially stretching the waved film or the waved assembly substantially in a transverse direction upon passing through the nip to form first row segments interspersed with second row segments,
    wherein the waving becomes fully or partly eliminated in second segments which become oriented by the substantially transverse stretching,
    wherein the waving is essentially maintained in first segments which do not become oriented by the substantially transverse stretching, and
    wherein the waving becomes stabilized by a contraction in the second segments.

2. The process according to claim 1, wherein the stuffing is carried out as a separate step.

3. The process according to claim 2, wherein the separate stuffing step comprises:
    feeding the film or the assembly between rubber belts which engage the film or the assembly so that while the film or the assembly contracts from a longitudinally strained state to a less strained state, the film or assembly obtains the fine traverse waving prior to entering the nip.

4. The process according to claim 1, wherein the grooved rollers (101) and (102) include indentations on crests of teeth of the grooved rollers (101) and (102).

5. The process according to claim 4, wherein:
    the stuffing is carried out while the film or the assembly enters the nip,
    where:
        the indentations on the crests of the grooved roller (101) modify a frictional engagement of the film or the assembly on the grooved roller (101), where the grooved roller (101) rotates at a circumferential velocity higher than a circumferential velocity of the grooved roller (102) so that the film or the assembly enters the nip at a film velocity that is higher than the velocity of the grooved roller (102), and
        the indentations on the crests of the grooved roller (102) are sufficient to reduce the film velocity or to reduce the assembly velocity to the velocity of the grooved roller (102).

6. The process according to claim 5, wherein the indentations on the crests of the grooved roller (101) comprise smooth indentations.

7. The process according to claim 6, wherein a smoothness of the smooth indentations is sufficient to allow harmless sliding of the stuffed film or assembly over the indented crests, while the stuffed film or assembly is in a strongly tentered state due to the substantially transverse stretching.

8. The process according to claim 1, wherein the grooved roller (101) and the grooved roller (102) have a diameter equal to or lower than 70 mm.

9. The process according to claim 1, further comprising:
    adding microvoid forming particles to a polymer material of the film or one of the films of the assembly so that the second segments become breathable due to formation of micropores.

10. The process according to claim 1, further comprising:
    laminating the substantially transversely stretched film or assembly (P) to a film (O) to form either a laminate wherein an orientation of the films do not cross or a crosslaminate wherein an orientation of the films cross.

11. The process according to claim 10, wherein the laminate is a crosslaminate.

12. The process according to claim 1, further comprising:
extrusion coating and laminating the film or the assembly (P) and a film (O) to form a laminate so that lamination is established as spot bonds localized on crown portions or base portions of some or all of the first segments.

13. The process according to claim 12, wherein the laminate is a crosslaminate.

14. A process of orienting a film or assembly of films comprising:
feeding the film or the assembly between rubber belts which engage the film or the assembly so that while the film or the assembly contracts from a longitudinally strained state to a less strained state, the film or assembly obtains a fine traverse waving,
stuffing the film or the assembly into a nip between two circularly or helically mutually intermeshing grooved rollers, grooved roller (101) and grooved roller (102), where the film or the assembly obtains a fine traverse waving either prior to or while entering the nip to form a waved film or a waved film assembly, and
sequentially stretching the waved film or the waved assembly substantially in a transverse direction upon passing through the nip to form first row formed segments interspersed with second row formed segments,
wherein the waving becomes fully or partly eliminated in the second row formed segments which become oriented by the substantially transverse stretching and
wherein the waving is essentially maintained in the first row formed segments which do not become oriented by the substantially transverse stretching and become stabilized by a contraction in the second row formed segments.

15. The process according to claim 14, wherein the grooved roller (101) and the grooved roller (102) have a diameter equal to or lower than 70 mm.

16. The process according to claim 14, further comprising:
adding microvoid forming particles to a polymer material of the film or one of the films of the assembly so that the second segments become breathable due to formation of micropores.

17. The process according to claim 14, further comprising:
laminating the substantially transversely stretched film or assembly (P) to a film (O) to form either a laminate wherein an orientation of the films do not cross or a crosslaminate wherein an orientation of the films cross.

18. The process according to claim 14, further comprising:
extrusion coating and laminating the film or the assembly (P) and a film (O) to form either a laminate wherein an orientation of the films do not cross or a crosslaminate wherein an orientation of the films cross so that lamination is established as spot bonds localized on crown portions or base portions of some or all of the first segments.

19. A process of orienting a film or assembly of films comprising:
stuffing the film or the assembly into a nip between two circularly or helically mutually intermeshing grooved rollers, groover roller (101) and grooved roller (102), include indentations on crests of teeth of the grooved roller (101) and the grooved roller (102) modifying a frictional engagement of the film or the assembly of the grooved roller (101), wherein the grooved roller (101) rotates at a circumferential velocity higher than a circumferential velocity of the grooved roller (102) so that the film or the assembly enters the nip at a film velocity that is higher than the velocity of the grooved roller (102), wherein the indentations on the crests of the grooved roller (102) are sufficient to reduce the film velocity or to reduce the film velocity to the velocity of the grooved roller (102), and wherein the film or the assembly obtains a fine traverse waving either prior to or while entering the nip to form a waved film or a waved film assembly,
sequentially stretching the waved film or the waved assembly substantially in a transverse direction upon passing through the nip to form first row segments interspersed with second row segments,
wherein the waving becomes fully or partly eliminated in the second row segments which become oriented by the substantially transverse stretching,
wherein the waving is essentially maintained in the first row segments which do not become oriented by the substantially transverse stretching, and
wherein the waving becomes stabilized by a contraction in the second row segments.

20. The process according to claim 19, wherein the indentations on the crests of the grooved roller (101) comprise smooth indentations having a smoothness sufficient to allow harmless sliding of the stuffed film or assembly over the indented crests, while the stuffed film or assembly is in a strongly tentered state due to the substantially transverse stretching.

21. The process according to claim 19, wherein the grooved roller (101) and the grooved roller (102) have a diameter equal to or lower than 70 mm.

22. The process according to claim 19, further comprising:
adding microvoid forming particles to a polymer material of the film or one of the films of the assembly so that the second segments become breathable due to formation of micropores.

23. The process according to claim 19, further comprising:
laminating the substantially transversely stretched film or assembly (P) to a film (O) to form either a laminate wherein an orientation of the films do not cross or a crosslaminate wherein an orientation of the films cross.

24. The process according to claim 19, further comprising:
extrusion coating and laminating the film or the assembly (P) and a film (O) to form either a laminate wherein an orientation of the films do not cross or a crosslaminate wherein an orientation of the films cross so that lamination is established as spot bonds localized on crown portions or base portions of some or all of the first segments.

* * * * *